United States Patent
Ogawa et al.

(10) Patent No.: US 9,134,940 B2
(45) Date of Patent: *Sep. 15, 2015

(54) PRINTING SYSTEM, COMPUTER, IMAGE FORMING APPARATUS AND PRINTING METHOD

(71) Applicant: Sharp Kabushiki Kaisha, Osaka-Shi, Osaka (JP)

(72) Inventors: Kazuma Ogawa, Osaka (JP); Kenji Onogi, Osaka (JP); Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,664

(22) Filed: Sep. 24, 2014

(65) Prior Publication Data

US 2015/0009538 A1    Jan. 8, 2015

Related U.S. Application Data

(62) Division of application No. 13/243,040, filed on Sep. 23, 2011, now Pat. No. 8,873,091.

(30) Foreign Application Priority Data

Sep. 27, 2010   (JP) ................................. 2010-215713

(51) Int. Cl.
*G06F 3/12*    (2006.01)
*H04N 1/00*    (2006.01)
*H04N 1/32*    (2006.01)

(52) U.S. Cl.
CPC ............ *G06F 3/1268* (2013.01); *G06F 3/1286* (2013.01); *H04N 1/00204* (2013.01); *H04N 1/00411* (2013.01); *H04N 1/00424* (2013.01); *H04N 1/00456* (2013.01); *H04N 1/00474* (2013.01); *H04N 1/00482* (2013.01); *H04N 1/32208* (2013.01); *H04N 1/32251* (2013.01); *H04N 1/32309* (2013.01); *H04N 1/32315* (2013.01); *H04N 1/32325* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 5,459,586 | A | * | 10/1995 | Nagasato et al. | 358/450 |
| 5,798,841 | A | * | 8/1998 | Takahashi | 358/296 |
| 6,590,675 | B1 | * | 7/2003 | Tomiyasu | 358/1.18 |
| 6,643,473 | B2 | * | 11/2003 | Moteki | 399/8 |
| 8,305,647 | B2 | * | 11/2012 | Maeno | 358/3.28 |
| 8,503,036 | B2 | * | 8/2013 | Cassidy et al. | 358/3.26 |
| 8,873,091 | B2 | * | 10/2014 | Ogawa et al. | 358/1.15 |
| 2009/0009816 | A1 | * | 1/2009 | Hagiwara | 358/403 |
| 2009/0201548 | A1 | * | 8/2009 | Hirakawa | 358/1.15 |

* cited by examiner

*Primary Examiner* — Ashish K Thomas
(74) *Attorney, Agent, or Firm* — Keating & Bennett, LLP

(57) ABSTRACT

In a printing system configured such that a computer and an image forming apparatus can be connected via a network, the computer sets a stamp image and transmits the set stamp image to the image forming apparatus via the network. The image forming apparatus includes a reading device that reads an original image, an image combining unit that reads out at least one stamp image from a storage unit, combines the stamp image with the original image read by the reading device, and forms a composite image, and a printing unit that prints the composite image on recording paper.

20 Claims, 18 Drawing Sheets

Composite Image

FIG.16

| Mask image | Original image | AND |
|---|---|---|
| 1 | Color | Color |
| 0 | Color | White |
| 1 | White | White |
| 0 | White | White |

PRINTING SYSTEM, COMPUTER, IMAGE FORMING APPARATUS AND PRINTING METHOD

CROSS-REFERENCE TO RELATED APPLICATION

This application is a divisional of U.S. patent application Ser. No. 13/243,040 filed Sep. 23, 2011, now U.S. Pat. No. 8,873,091, which claimed priority under 35 U.S.C. §119(a) to Japanese Patent Application No. 2010-215713 filed in Japan on Sep. 27, 2010, the entire contents of which are herein incorporated by reference.

BACKGROUND OF THE INVENTION

1. Field of the Invention

The present invention relates to a printing system, computer, image forming apparatus and printing method for combining a stamp image with an original image in overlaying relationship so as to form a composite image and printing the composite image on recording paper.

2. Description of the Related Art

Some of image forming apparatuses such as multifunction peripherals have a function of, when printing an original image, combining a stamp image including, for example, characters, a graphic or a symbol with the original image so as to form a composite image and printing the composite image on recording paper.

With such an image forming apparatus, for example, default stamp images are stored in memory of the image forming apparatus, and a stamp image is read out from the memory and combined with an original image when the original image is printed, and the resulting composite image is printed on recording paper.

JP 2002-333959A (hereinafter referred to as Patent Document 1) discloses a printing system in which a stamp image is combined with an original image by a personal computer, the resulting composite image is transmitted from the personal computer to an image forming apparatus via a network, and the composite image is printed on recording paper by the image forming apparatus.

However, in the case where the default stamp images stored in the memory of the image forming apparatus are used, there is a small selection of stamp images, and therefore it is often the case that the stamp images do not meet user's needs. Also, with the image forming apparatus, it is not possible to combine a plurality of different stamp images with an original image.

In the case where a stamp image is combined with an original image by a personal computer as in Patent Document 1, although a variety of stamp images can be used, an image transmitted from the personal computer to the image forming apparatus is a composite image obtained by combining a stamp image with an original image. Accordingly, selecting a stamp image is not possible on the image forming apparatus side, and an original image read on the image forming apparatus side cannot be combined with a stamp image. In other words, this configuration has a problem of poor usability.

SUMMARY OF THE INVENTION

The present invention has been made in view of the above-described circumstances, and it is an object of the present invention to provide a printing system, computer, image forming apparatus and printing method with which it is possible to use a variety of stamp images according to the user's request, select a stamp image on the image forming apparatus side, and combine the selected stamp image with an original image read by the image forming apparatus.

In order to solve the problems described above, a printing system according to the present invention is a printing system configured such that a computer and an image forming apparatus can be connected via a network, the computer setting a stamp image and transmitting the set stamp image to the image forming apparatus via the network, the image forming apparatus including: a reading device that reads an original image: a storage unit that stores the stamp image received from the computer; an image combining unit that reads out at least one stamp image from the storage unit, combines the stamp image with the original image read by the reading device, and forms a composite image; and a printing unit that prints the composite image on recording paper.

With the printing system of the present invention, because a stamp image is set on the computer side and the set stamp image is transmitted to and registered in the image forming apparatus, a variety of stamp images including characters, a graphic or both characters and a graphic can be set and registered.

The printing system of the present invention may be configured such that, for example, a stamp image can be transmitted from the computer to the image forming apparatus via the network by providing a stamp image setting unit that sets a stamp image in a printer driver installed on the computer that transmits an original image from the computer to the image forming apparatus via the network, and it is possible to reduce the load on the image forming apparatus side by converting a stamp image into PDL data and the like and transmitting the stamp image to the image forming apparatus with the printer driver including the stamp image setting unit. Also, when a stamp image is set to the same size as the size of recording paper that is subjected to a printing process performed by the image forming apparatus, the size and position of the characters or graphic included in the stamp image can be set to appropriate size and position with respect to the size of recording paper.

Furthermore, with the printing system of the present invention, selecting a stamp image and combining the selected stamp image with the original image read by the reading device can be performed on the image forming apparatus side, and it is therefore possible to provide the user ease of use.

Also, in the printing system of the present invention, the image forming apparatus may include a display unit that displays display information corresponding to at least one stamp image stored in the storage unit, and the image combining unit may read out, from the storage unit, at least one stamp image Whose display information is displayed on the display unit, combine the stamp image with the original image read by the reading device, and form a composite image. With this configuration, the user can easily provide an instruction to combine a stamp image to the image forming apparatus.

Furthermore, in the printing system of the present invention, the image forming apparatus may include a control unit that reads out, from the storage unit, at least one stamp image whose size is the same as a size of recording paper on which the original image read by the reading device is to be recorded and that displays at least one piece of display information corresponding to the read stamp image on the display unit.

Stamp images of various sizes can be recorded in the storage unit so as to cope with a plurality of types of recording paper. In this case, if all of the stamp images stored in the storage unit are displayed on the display unit, ore in other words, if not only the stamp images corresponding to the size of recording paper on which the original image is to be recorded but also the stamp images that do not correspond to the size of the recording paper are displayed on the display unit, the user of the image forming apparatus cannot identify which stamp image corresponds to the size of the recording paper. In other words, the user of the image forming apparatus cannot identify, from among the stamp images displayed on the display unit, which stamp image to select to combine with the original image in order not to miss a part of the stamp image, specifically, a part (for example, characters, graphics or the like), of the stamp image, that should be displayed. This may cause a possibility of the occurrence of unexpected print results and waste of paper. However, as described in the preceding paragraph, by displaying only the display information of stamp images whose size is the same as the size of recording paper on which the original image read by the reading device is to be recorded on the display unit of the image forming apparatus, the user of the image thrilling apparatus can identify the stamp images corresponding to the size of the recording paper. To rephrase, regardless of the stamp image selected by the user from among stamp images whose display information is displayed on the display unit, the stamp image can be combined with the original image without missing a part of the stamp image. Accordingly, the occurrence of unexpected print results and waste of paper can be prevented. Also, it is unnecessary to set the combined position and size of the stamp image according to the size of recording paper on which printing is to be performed each time the stamp image is combined with the original image, and it is therefore possible to provide the user ease of use.

Also, in the printing system of the present invention, the image forming apparatus may include a control unit that selects at least one stamp image whose display information is displayed on the display unit and that prohibits the image combining unit from forming a composite image if a size of the selected stamp image does not match a size of recording paper on which the original image read by the reading device is to be recorded.

In this case, no composite image is formed unless the size of the stamp image matches the size of recording paper, and it is therefore possible to prevent a composite image from being printed with a part of the stamp image missing and suppress the occurrence of unexpected print results and waste of paper.

Furthermore, in the printing system of the present invention, the computer may set a stamp image and display information corresponding to the stamp image and transmit the set stamp image and display information to the image forming apparatus via the network, and in the image forming apparatus, the storage unit may store the stamp image and display information received from the computer in association with each other, and the display unit may display at least one stamp image and display information stored in the storage unit.

In this case, stamp images and display information can be created collectively on the computer side, and thus it is unnecessary to create display information on the image forming apparatus side.

Also, in the printing system of the present invention, the computer may set an image that is translucent or opaque to the original image as the stamp image.

By selectively setting a translucent image or an opaque image, the range of application of stamp images can be expanded.

For example, in a case where the stamp image read out from the storage unit is a translucent image, the image combining unit may combine the stamp image with the original image in overlaying relationship.

Also, in a case where the stamp image read out from the storage unit is an opaque image, the image combining unit may generate a mask image based on the stamp image, combine the mask image with the original image, and combine the stamp image in a region of the mask image on the original image.

Also, in the printing system of the present invention, the stamp image may be constituted by at least one character or graphic.

In this case, it is possible to use a stamp image in which a plurality of character strings, graphics and the like are laid out, and therefore the usability of the stamp imago can be improved.

Furthermore, in the printing system of the present invention, before a stamp image is transmitted to the image forming apparatus via the network, the computer may display a confirmation message asking whether or not to transmit the stamp image on a display device connected to the computer. With this configuration, it is possible to suppress a situation in which a stamp image is registered due to an operation error.

Next, a computer according to the present invention is a computer configured to be capable of being connected to an image forming apparatus via a network, wherein the computer sets a stamp image and transmits the set stamp image to the image forming apparatus via the network.

Such a computer can be applied as a computer that constitutes the printing system of the present invention described above.

Next, an image forming apparatus according to the present invention includes a reading device that reads an original image, a storage unit in which a stamp image received from an external apparatus via a network is recorded, an image combining unit that reads out at least one stamp image from the storage unit, combines the stamp image with the original image read by the reading device and forms a composite image, and a printing unit that prints the composite image on recording paper. As used herein, "external apparatus" refers not only to the computer of the present invention described above, but also to any apparatus that can be connected to an image forming apparatus via a network.

Also, in the image forming apparatus of the present invention, the image combining unit may combine at least one stamp image and the original image read by the reading device on a page memory. With this configuration, the stamp image and the original image can be combined with accuracy.

Furthermore, the image forming apparatus of the present invention may include a display unit that displays display information corresponding to at least one stamp image stored in the storage unit, the storage unit may store a stamp image together with a registration name of the stamp image, the display unit may display the registration name of the stamp image as display information corresponding to the stamp image, and the image combining unit may read out, from the storage unit, at least one stamp image whose registration name is displayed on the display unit, combine the stamp image with the original image read by the reading device, and form a composite image. With this configuration, the user can easily provide an instruction to combine a stamp image to the image forming apparatus.

Furthermore, the image forming apparatus of the present invention includes a display unit that displays display information corresponding to at least one stamp image stored in the storage unit, the storage unit stores, as the display information corresponding to the stamp image, a registration name of the stamp image, information indicating that the stamp image is an image that is either translucent or opaque to the original image, and a size of recording paper, and the display unit displays a stamp image as a thumbnail, as well as displaying at least one of the registration name of the stamp image, the information indicating that the stamp image is an image that is either translucent or opaque to the original image, and the size of recording paper. With this configuration, the user can easily understand stamp image information.

Also, the image forming apparatus of the present invention may include a display unit that displays display information corresponding to at least one stamp image stored in the storage unit, and a control unit that reads out, from the storage unit, at least one stamp image whose size is the same as a size of recording paper on which the original image read by the reading device is to be recorded and that displays at least one piece of display information corresponding to the read stamp image on the display unit, and the image combining unit may read out, from the storage unit, at least one stamp image whose display information is displayed on the display unit, combine the stamp image with the original image read by the reading device, and form a composite image.

Stamp images of various sizes can be recorded in the storage unit so as to cope with a plurality of types of recording paper. In this case, if all of the stamp images stored in the storage unit are displayed on the display unit, or in other words, if not only the stamp images corresponding to the size of recording paper on which the original image is to be recorded but also the stamp images that do not correspond to the size of the recording paper are displayed on the display unit, the user of the image forming apparatus cannot identify which stamp image corresponds to the size of the recording paper. In other words, the user of the image forming apparatus cannot identify, from among the stamp images displayed on the display unit, which stamp image to select to combine with the original image in order not to miss a part of the stamp image, specifically, a part (for example, characters, graphics or the like), of the stamp image, that should be displayed. This may cause a possibility of the occurrence of unexpected print results and waste of paper. However, as described in the preceding paragraph, by displaying only the display information of stamp images whose size is the same as the size of recording paper on which the original image read by the reading device is to be recorded on the display unit of the in forming apparatus, the user of the image forming apparatus can identify the stamp images corresponding to the size of the recording paper. To rephrase, regardless of the stamp image selected by the user from among stamp images whose display information is displayed on the display unit, the stamp image can be combined with the original image without missing a part of the stamp image. Accordingly, the occurrence of unexpected print results and waste of paper can be prevented. Also, it is unnecessary to set the combined position and size of the stamp image according to the size of recording paper on which printing is to be performed each time the stamp image is combined with the original image, and it is therefore possible to provide the user ease of use.

Furthermore, the image forming apparatus of the present invention may include a display unit that displays display information corresponding to at least one stamp image stored in the storage unit, and a control unit that selects at least one stamp image whose display information is displayed on the display unit and that prohibits the image combining unit from forming a composite image if a size of the selected stamp image does not match a size of recording paper on which the original image read by the reading device is to be recorded.

In this case, no composite image is formed unless the size of the stamp image matches the size of recording paper, and it is therefore possible to prevent a composite image from being printed with a part of the stamp image missing and suppress the occurrence of unexpected print results and waste of paper.

Next, a printing method according to the present invention is a printing method for printing a composite image in which a stamp image has been combined with an original image on recording paper using an image forming apparatus in a printing system configured such that a computer and the image forming apparatus can be connected via a network, the method including: a stamp image creating step in which the computer creates a stamp image; a transmitting step in which the stamp image created in the stamp image creating step is transmitted from the computer to the image forming apparatus via the network; a recording step in which the image forming apparatus records the stamp image received from the computer in a storage unit included in the image forming apparatus; a reading step in which the image forming apparatus reads an original image; a combining step in which the image forming apparatus reads out at; least one stamp image from the storage unit, combines the read stamp image with the original image read in the reading step, and forms a composite image; and a printing step in which the image forming apparatus prints the composite image formed in the combining step on recording paper.

Also, the printing method of the present invention may include a displaying step in which the image forming apparatus reads out, from the storage unit, at least one stamp image whose size is the same as a size of recording paper on which the original image read in the reading step is to be recorded and displays at least one piece of display information corresponding to the read stamp image on a display unit included in the image forming apparatus, and a selecting step in which at least one stamp image whose display information is displayed on the display unit is selected, and in the combining step, the image forming apparatus may read out, from the storage unit, one stamp image selected in the selecting step and combine the read stamp image with the original image read in the reading step.

Furthermore, the printing method of the present invention may include a displaying step in which the image forming apparatus displays display information corresponding to at least one stamp image stored in the storage unit on a display unit, a selecting step in which one stamp image whose display information is displayed on the display unit is selected, and a prohibiting step in which formation of the composite image is prohibited if a size of the stamp image selected in the selecting step does not match a size of recording paper on which the original image read in the reading step is to be recorded.

With the printing method described above, the same effects as those of the printing system of the present invention described above can be obtained.

BRIEF DESCRIPTION OF THE DRAWINGS

FIG. 16 is an operation table showing AND combination of CMYK image components and a mask image.

DESCRIPTION OF THE PREFERRED EMBODIMENT

Hereinafter, embodiments of the present invention will be described in detail with reference to the accompanying drawings.

Figure 1:
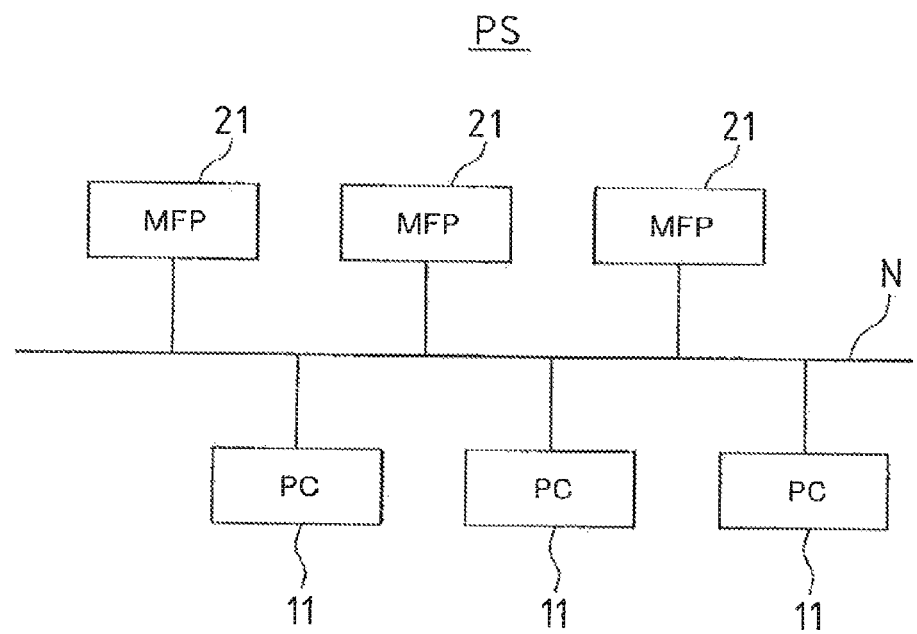
FIG. 1 is a block diagram showing an overall configuration of a printing system according to a first embodiment of the present invention.

FIG. 1 is a block diagram showing a printing system according to a first embodiment of the present invention. In a printing system PS according to the first embodiment, a plurality of personal computers (PCs) 11 and a plurality of multifunction peripherals (MFPs) 21 are connected via a network N such that transmission and reception of various types of data between the PCs 11 and the MFPs 21 is possible. Here, the network N is assumed to be a LAN, the Internet or the like, but any other types of networks may be used.

Figure 2:
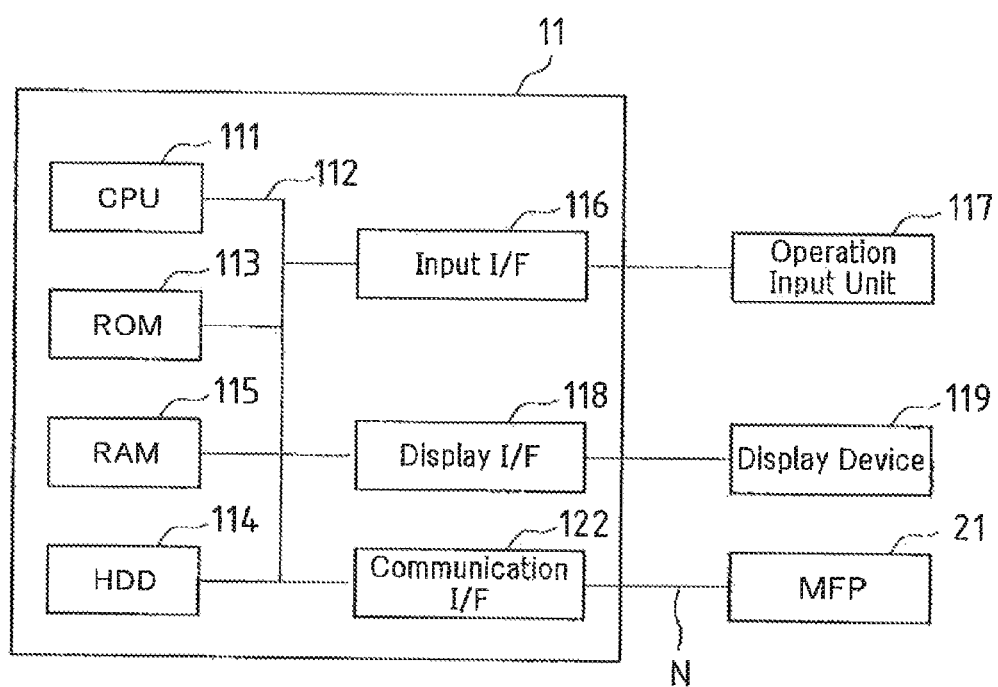
FIG. 2 is a block diagram showing a hardware configuration of a computer in the printing system according to the first embodiment.

FIG. 2 is a block diagram showing a hardware configuration of a PC 11. In FIG. 2, a CPU 111 (control unit) performs overall control of the PC 11 by controlling component devices and the like via a bus 112. A ROM 113 and a HDD 114 store a BIOS (basic input/output system) and an operating system (OS) that are executed by the CPU 111, and various types of programs and the like that are necessary to implement the functionality of the PC 11. The PC 11 is connected to an operation input unit 117 and a display device 119.

A RAM 115 functions as the main memory a working area and the like for the CPU 111. The CPU 111 loads a necessary program and the like from the ROM 113 and the HDD 114 into the RAM 115 to execute the program and the like.

An input I/F 116 relays input from the operation input unit 117 including a keyboard, a mouse and the like to the CPU 111.

A display I/F 118 is a port that is used when the CPU 111 controls display on the display device 119 by transmitting output data to the display device 119. The CPU 111 rasterizes text data (hereinafter referred to simply as "text"), image data (hereinafter referred to simply as an "image") or the like in a display memory area in the RAM 115 or the like, transmits the rasterized text, image or the like to the display device 119 via the display I/F 118 as output data, and displays the text, image or the like on a screen of the display device 119. The CPU 111 moves a cursor on the screen of the display device 119 according to the input from the operation input unit 117 such that instructions can be provided with the cursor. The display device may be any type of display device such as a liquid crystal display device, a CRT or an EL display device.

A communication I/F 122 performs data communication with the MFPs 21 via the network N, as well as performing communication control over the data communication. For example, communication control using TCP/IP is performed.

Figure 3:
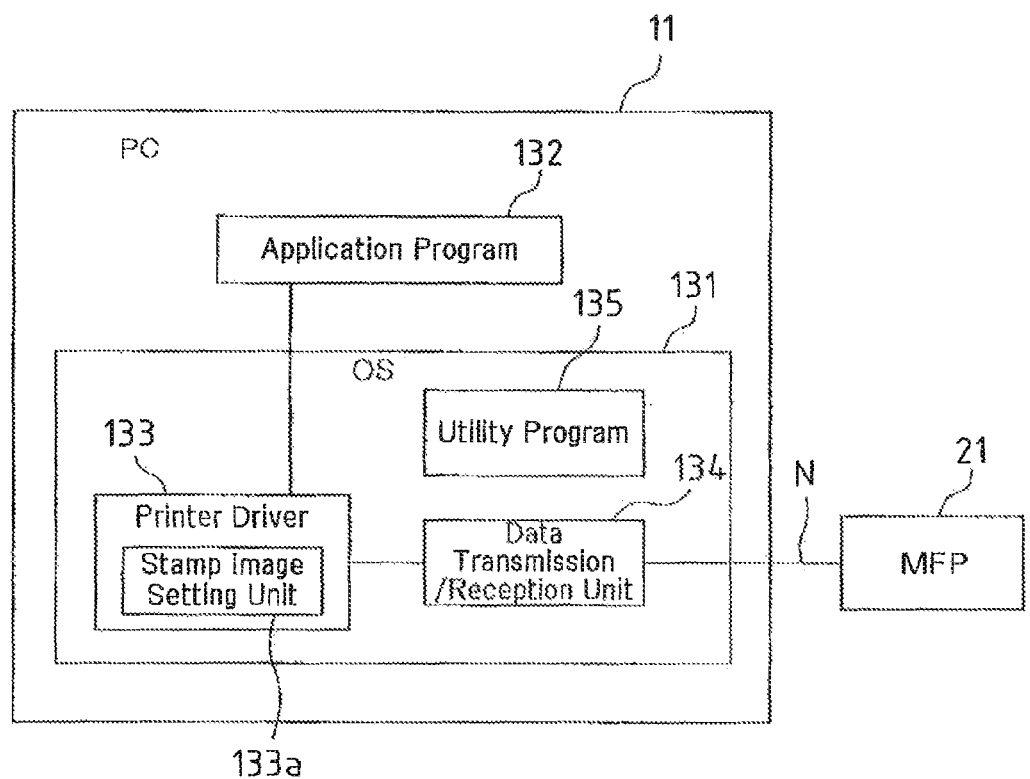
FIG. 3 is a block diagram showing a configuration of components of the computer that are involved in printing and a software configuration relevant to printing in the printing system according to the first embodiment.

FIG. 3 is a block diagram showing a configuration of components of the PC 11 that are involved in printing and a software configuration relevant to printing. The PC 11 includes an operating system (hereinafter referred to an "OS") 131 and various types of application programs 132. The OS 131 includes a printer driver program for generating PDL data and transmitting the data to the MFPs 21, and a utility program 135 that supports data processing and the operation of the PC 11. The printer driver program and the utility program 135 run on the OS 131. The printer driver program incorporates a data transmission/reception program for controlling data communication performed via the network N. A printer driver 133 that functions as a data transmission/reception unit 134 is provided in the PC 11 by the CPU 111 executing the printer driver program. In FIG. 3 and the description of the present specification, for the sake of convenience, the printer driver 133 as software and the data transmission/reception unit 134 as hardware are shown as separate elements, but the printer driver 133 and the data transmission/reception unit 134 serve to perform a transmission/reception function related to printing. In the following description, no distinction will be made between the printer driver program and the printer driver implemented by the CPU 111 executing the printer driver program, and the printer driver program will also be treated as the printer driver 133.

Figure 4:
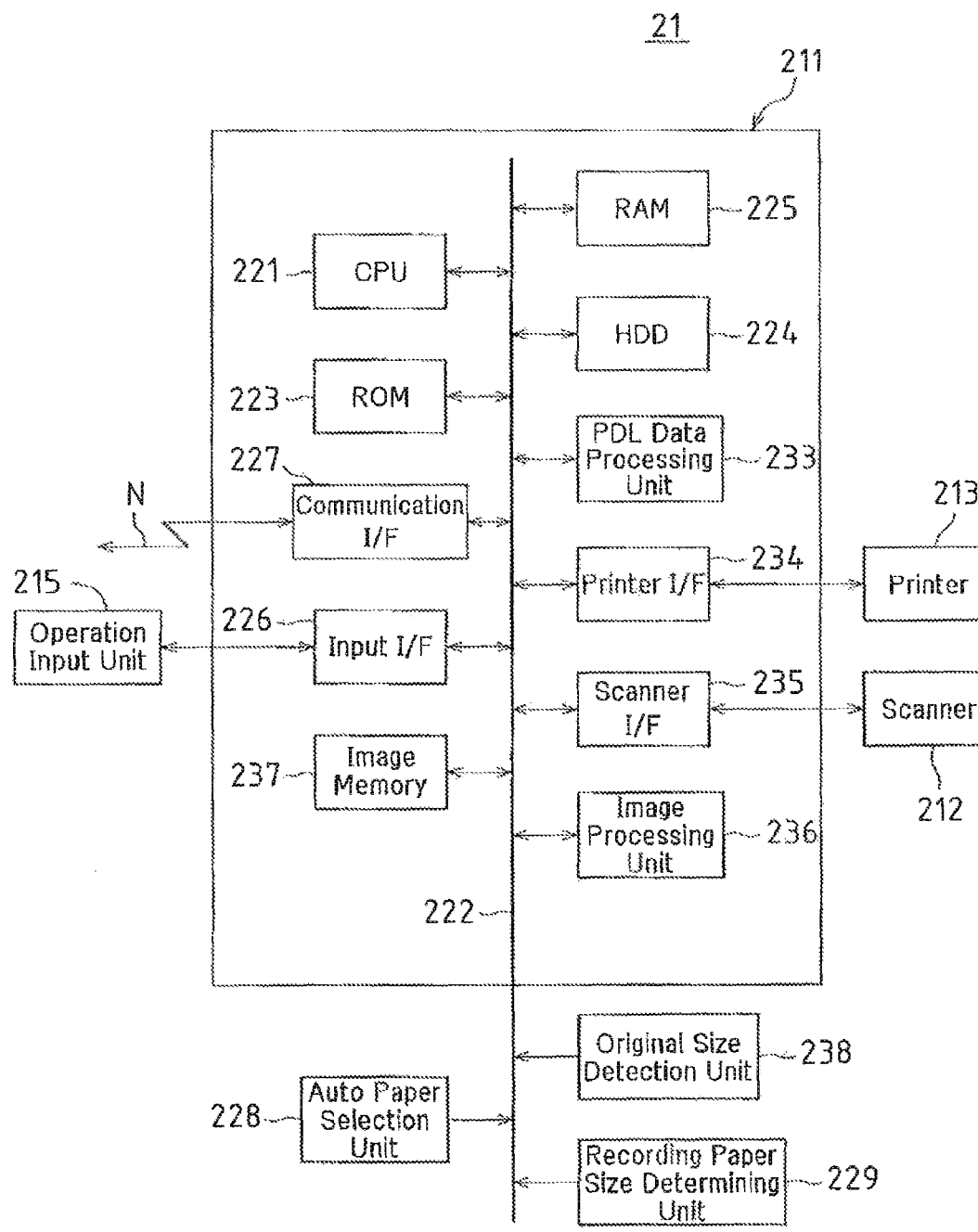
FIG. 4 is a block diagram showing a hardware configuration of a multifunction peripheral in the printing system according to the first embodiment.

FIG. 4 is a block diagram showing a hardware configuration of an MFP 21. The MFP (multifunction peripheral) 21 is an image forming apparatus having multiple functions including a scanner function, a copy function, a printer function, a facsimile function, and so on.

In FIG. 4, an image control unit 211 controls a scanner (reading device) 212 that reads original image data (hereinafter referred to simply as an "original image") and a printer 213 that prints (records) the original image on recording paper. The image control unit 211 also transmits and receives PDL data and the like via the network N.

In the image control unit 211, a CPU 221 (control unit) performs overall control of the MFP 21 by controlling component devices and the like via a bus 222. A ROM 223 stores a boot program and various types of control programs. A hard disk drive (HDD, storage unit) 224 stores various types of application programs, images and the like.

A RAM 225 functions as the main memory a working area and the like for the CPU 221. The CPU 221 controls the MFP 21 by loading a necessary program and the like from the ROM 223 and the HDD 224 into the RAM 225 to execute the program and the like.

An input I/F 226 is an interface for an operation input unit 215. For example, in the case where the operation input unit 215 includes a touch panel type display screen (display unit), the input I/F 226 determines input with respect to a button, key or the like on the display screen.

A communication I/F 227 performs data communication with the PCs 11 via the network N, as well as performing communication control over the data communication.

A PDL data processing unit 233 analyzes PDL data to develop it into a bitmap image (image data).

A printer I/F 234 is a port for implementing data input/output between the printer 213 and the image control unit 211, and performs a synchronous/asynchronous conversion process on an image, and outputs the image that has been subjected to the synchronous/asynchronous conversion process to the printer 213. The printer 213 records the original image (raster image) on recording paper, and may be any printer such as an electrophotographic printer that forms a toner image on a photoconductor and transfers the toner image onto recording paper, or an inkjet printer that sprays ink directly onto recording paper.

A scanner I/F 235 is a port for implementing data input/output between the scanner 212 and the image control unit 211, and performs a synchronous/asynchronous conversion process on an image input from the scanner 212. The scanner 212 reads an original image using a CCD line sensor and outputs the original image (raster image) to the scanner I/F 235.

An image processing unit 236 corrects, processes and edits an image, and performs, for example, correction according to the characteristics of the MFP 21, resolution conversion and the like. Alternatively, the image processing unit 236 performs image rotation, a process for compressing, decompressing and converting multivalued image data into and from the JPEG format, a process for compressing and decompressing binary image data into and from a format such as JBIG, MMR or MH, and an image combining process. In the present embodiment, the image processing unit 236 functions as an image combining unit that combines a stamp image, which will be described later, with an original image read by the scanner 212 so as to form a composite image.

An image memory 237 temporarily stores an image input from the scanner 212 to the scanner I/F 235 or an image received by the communication I/F 227 from any of the PCs 11 via the network N.

An original size detection unit 238 is a sensor provided in an original tray, a sensor provided on an original placing plate, or a sensor provided in an original conveyance path, and detects the size of an original. The original tray is a tray on which an original to be read by the scanner 212 is placed, and the original drawn from the original tray is conveyed to the scanner 212. The original placing plate is a transparent glass plate on which an original is placed, and the scanner 212 reads the original via the original placing plate. The original conveyance path is a path through which the original is conveyed, and the original is conveyed to the scanner 212 via the conveyance path.

Alternatively, the original size detection unit 238 detects the size of an original based on the original image pre-scanned by the scanner 212. For example, the original size detection unit 238 can read each side of an original using a photoelectric conversion device (CCD) and detect the size of the original based on the length of each side (the width and length of the original).

A recording paper size determining unit 229 determines the standard size of respective recording paper contained in a plurality of paper feed cassettes (not shown) of the MFP (multifunction peripheral) 21. For example, each paper feed cassette is equipped with a lever operated to indicate the standard size of recording paper. When the lever is pivoted to a position corresponding to the standard size of recording paper contained in each paper fed cassette, the recording paper size determining unit 229 detects the position of the lever and determines the standard size of the recording paper based on the position of the lever. The decision output from the recording paper size determining unit 229 indicates the standard size of the recording paper.

The original size detection unit 238 and the recording paper size determining unit 229 may detect or determine the size of an original or the size of recording paper by using any other mechanism or method.

The CPU 221 obtains the standard size of recording paper contained in each paper feed cassette based on the decision output from the recording paper size determining unit 229. Then, the CPU 221 creates a paper size data table in which each paper feed cassette is associated with the standard size of the recording paper contained in the paper feed cassette, and records the table on the HDD 224. For example, the CPU 221 creates a paper size data table in which an upper paper feed cassette is associated with a standard size of A4, a middle paper feed cassette is associated with a standard size of A3, and a lower paper feed cassette is associated with a standard size of B5, and records the table on the HDD 224. When a change is made to the standard size of recording paper contained in a paper feed cassette, the CPU 221 updates the paper size data table by changing the standard size of recording paper corresponding to the paper feed cassette in the paper size data table based on the decision output from the recording paper size determining unit 229.

When the original size detection unit 238 has detected the size of an original, the CPU 221 references the paper size data table recorded on the HDD 224, selects a paper feed cassette containing recording paper whose standard size is the same as the size of the original detected by the original size detection unit 238 from among a plurality of paper feed cassettes of the MFP (multifunction peripheral) 21, and instructs an auto paper selection unit 228 to feed recording paper from the selected paper feed cassette. In response to this instruction, the auto paper selection unit 228 draws recording paper from the paper feed cassette containing recording paper whose standard size is the same as the size of the original and feeds the recording paper to the printer 213.

There are cases where the standard size of recording paper is specified through an input operation of the operation input unit 215. For example, in the case where a plurality of pages of an original are recorded per sheet of recording paper, the standard size of the recording paper is specified through an input operation of the operation input unit 215. In this case as well, the CPU 221 references the paper size data table stored on the HDD 224, selects a paper feed cassette containing recording paper whose standard size has been specified through the input operation of the operation input unit 215 from among a plurality of paper feed cassettes of the MFP (multifunction peripheral) 21, and instructs the auto paper selection unit 228 to feed recording paper from the selected paper feed cassette. In response to this instruction, the auto paper selection unit 228 draws recording paper from the paper feed cassette containing the standard size recording paper specified through the input operation, and feeds the recording paper to the printer 213.

In the printing system PS configured as described above, the printer driver 133 of a PC 11 acquires an original image and settings for printing generated by execution of an application program 132, converts the acquired original image and settings for printing into PDL data and transmits the obtained data to an MFP 21 from the data transmission/reception unit 134 via the network N.

In the MFP 21, when the PDL data is received by the communication I/F 227, the received PDL data is input into the PDL data processing unit 233 via the bus 222. The PDL data is analyzed and developed into a bitmap image (image data) by the PDL data processing unit 233. The image data is processed by the image processing unit 236. The processed image data is output to the printer 213 via the printer I/F 234, and the original image indicated by the image data is printed on recording paper by the printer 213. In this case, the printer function of the MFP 21 is used.

When the MFP 21 acquires an original image from the scanner 212 via the scanner I/F 235, the original image is processed by the image processing unit 236. The processed original image is output to the printer 213 via the printer I/F 234. The original image is printed on recording paper by the printer 213. In this case, the copy function of the MFP 21 is used.

In FIG. 1, the printer driver 133 of each PC 11 can specify the address of an MFP 21 on the network N and transmit PDL data and the like to the MFP 21 having the specified address.

With the printing system PS of the first embodiment, it is possible to create image data of a stamp image (hereinafter referred to simply as a "stamp image") on the PC 11 side, transmit the stamp image to any of the MFPs 21 from a PC 11 and register the stamp image on the HDD 224, and when the MFP 21 performs copying, read the stamp image from the HDD 224, combine the stamp image with the original image to form a composite image, and record the composite image on recording paper by the printer 213.

The PC 11 can create various types of stamp images by using various types of application programs 132, transmit the stamp images to the MFP 21 via the printer driver 133, and register the stamp images on the HDD 224 of the MFP 21. The PC 11 also includes a stamp image setting unit 133a for setting and registering stamp images. The stamp image setting unit 133a converts a stamp image into PDL data and transmits the PDL data to the MFP 21 in the same manner as the original image is transmitted to the MFP 21 the printer driver 133. The first embodiment is configured such that a stamp image setting program for setting and registering stamp images is incorporated in the printer driver program of the OS 131 of the PC 11, and by the CPU 111 executing the printer driver program, the printer driver 133 having the stamp image setting unit 133a is provided in the PC 11 as shown in FIG. 3. In other words, a stamp image transmission/reception function is constituted by the stamp image setting unit 133a and the printer driver 133 that are software and the data transmission/reception unit 134 that is hardware. Alternatively, the stamp image setting program may be provided in the OS 131 of the PC 11 separately from the printer driver program, and the stamp image transmission/reception function may be implemented by the stamp image setting unit 133a and the data transmission/reception unit 134 by the CPU 111 executing the stamp image setting program alone, independently of the printer driver program, to provide the stamp image setting unit 133a in the PC 11 separately from the printer driver 133. In the following description, no distinction will be made between the stamp image setting program and the stamp image setting unit configured by the CPU 111 executing the stamp image setting program, and the stamp image setting program will also be treated as the stamp image setting unit 133a.

The MFP 21 receives and analyzes PDL data of a stamp image in the same manner as the PDL data of an original image. After a variety of stamp images have been received and registered on the HDD 224, the user of the MFP 21 can select a desired stamp image via the operation input unit 215, and cause the selected stamp image to be combined with the original image and the resulting image to be recorded on recording paper, and it is therefore possible to provide the user ease of use.

Next, a procedure for creating a stamp image on the PC 11 side and registering the stamp image on the HDD 224 of an MFP 21 will be described.

For example, with the PC 11, the user creates a stamp image in a window displayed on the screen of the display device 119 with the use of an application program 132 such as Word (a product of Microsoft Corporation) by operating the operation input unit 117. At this time, the size of the stamp image is set to the same size as that of recording paper on which the original image is to be recorded on the MFP 21 side. Because a plurality of recording paper of different standard sizes are used in the MFP 21, the size of the stamp image is set to one of the standard sizes.

A plurality of different types of character strings, graphics and the like may be laid out on a single stamp image. However, even if the same character strings, graphics and layout are used, when the size of the stamp image is different, a stamp image is created for each size by laying out the character strings and graphics. This is done to avoid a situation in which, in the case where a plurality of stamp images having different sizes are created by magnifying or demagnifying a stamp image, the character strings, graphics and the like that constitute the stamp image appear excessively small or large in size. For example, even if the size of the stamp image is different, it is preferable that the size of the characters is constant so as to provide readability of the characters. Also, it is preferable that the size of a seal (signature) area and the size of a company logo are constant. If a stamp image created with a standard size of A4 (the Japanese Industrial Standards) is demagnified and combined with recording paper of a standard size of B5 (the Japanese Industrial Standards), a situation can occur in which the seal area will be small with respect to the size of a seal, or the company logo, the department name, the telephone number and the like cannot be read. Furthermore, it is preferable to set a layout of the character strings, graphics and the like for each size of the stamp image. For this reason, a stamp image is created for each size without performing magnification or demagnification of the stamp image.

Figure 5A:
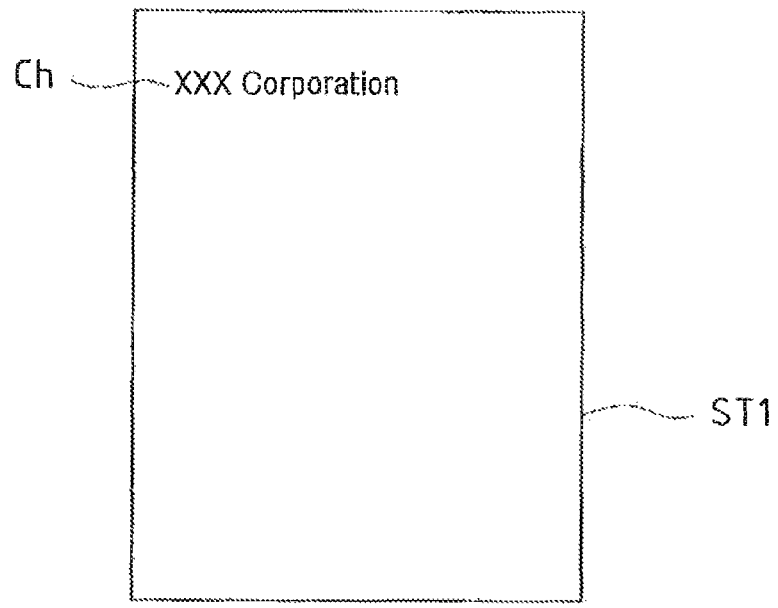
FIG. 5A is a diagram showing an example of a stamp image.
Figure 5B:
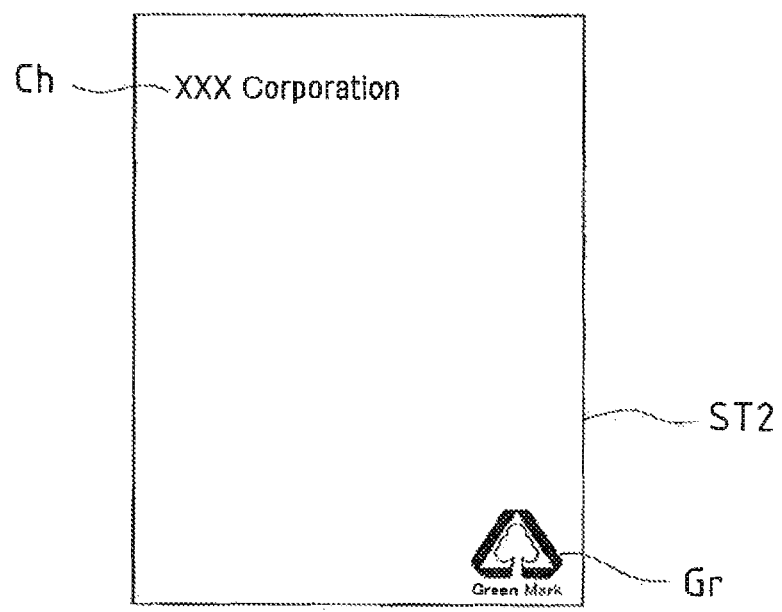
FIG. 5B is a diagram showing another example of a stamp image.

FIGS. 5A and 5B show examples of stamp images. A stamp image ST1 shown in FIG. 5A is a color image in which a plurality of characters Ch are laid out. A stamp image ST2 shown in FIG. 5B is a color image in which a plurality of characters Ch and a graphic Gr are laid out. Specifically, a company logo, a seal (signature) area, a department name, a telephone number and the like can be set as characters Ch and graphics Gr.

After a stamp image has been created using an application program 132 in the manner described above (stamp image creating step), the printer driver 133 (printer driver program) is launched via the application program 132. For example, the printer driver 133 (printer driver program) can be launched by pressing (specifying) a particular button on the menu bar in a window displayed on the screen of the display device 119 through an operation of the operation input unit 117. A user interface window 301 as shown in FIG. 6 is displayed on the screen of the display device 119.

Figure 7:
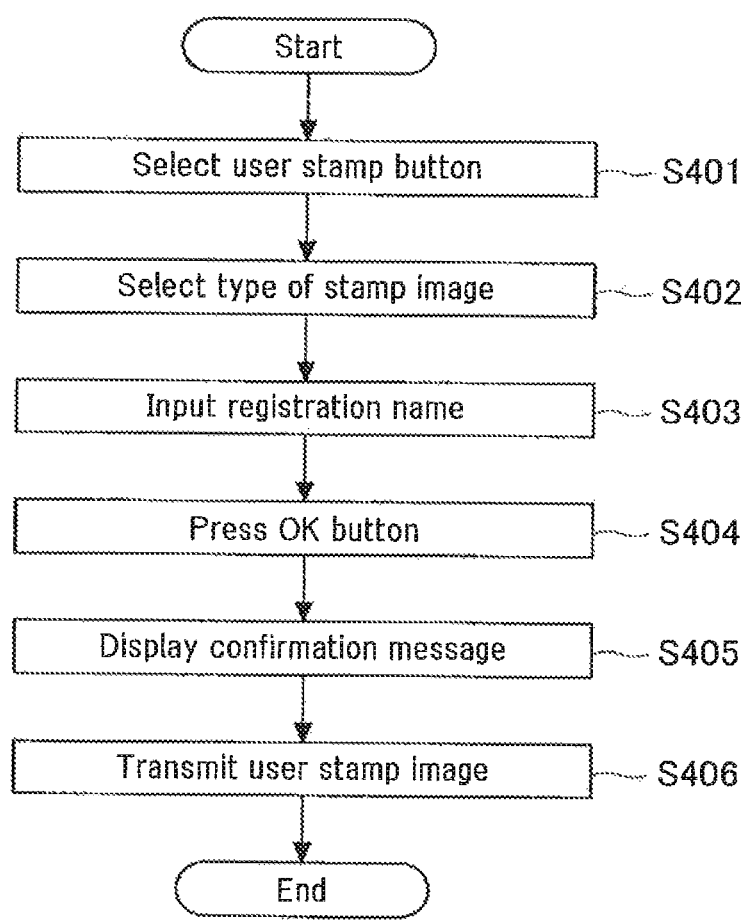
FIG. 7 is a flowchart illustrating a stamp image setting process executed in the printing system according to the first embodiment.

After the user interface window 301 has been displayed on the screen of the display device 119, processing of the flowchart shown in FIG. 7 is performed interactively by the CPU 111 executing the printer driver program, or in other words, by the printer driver 133.

Figure 6:
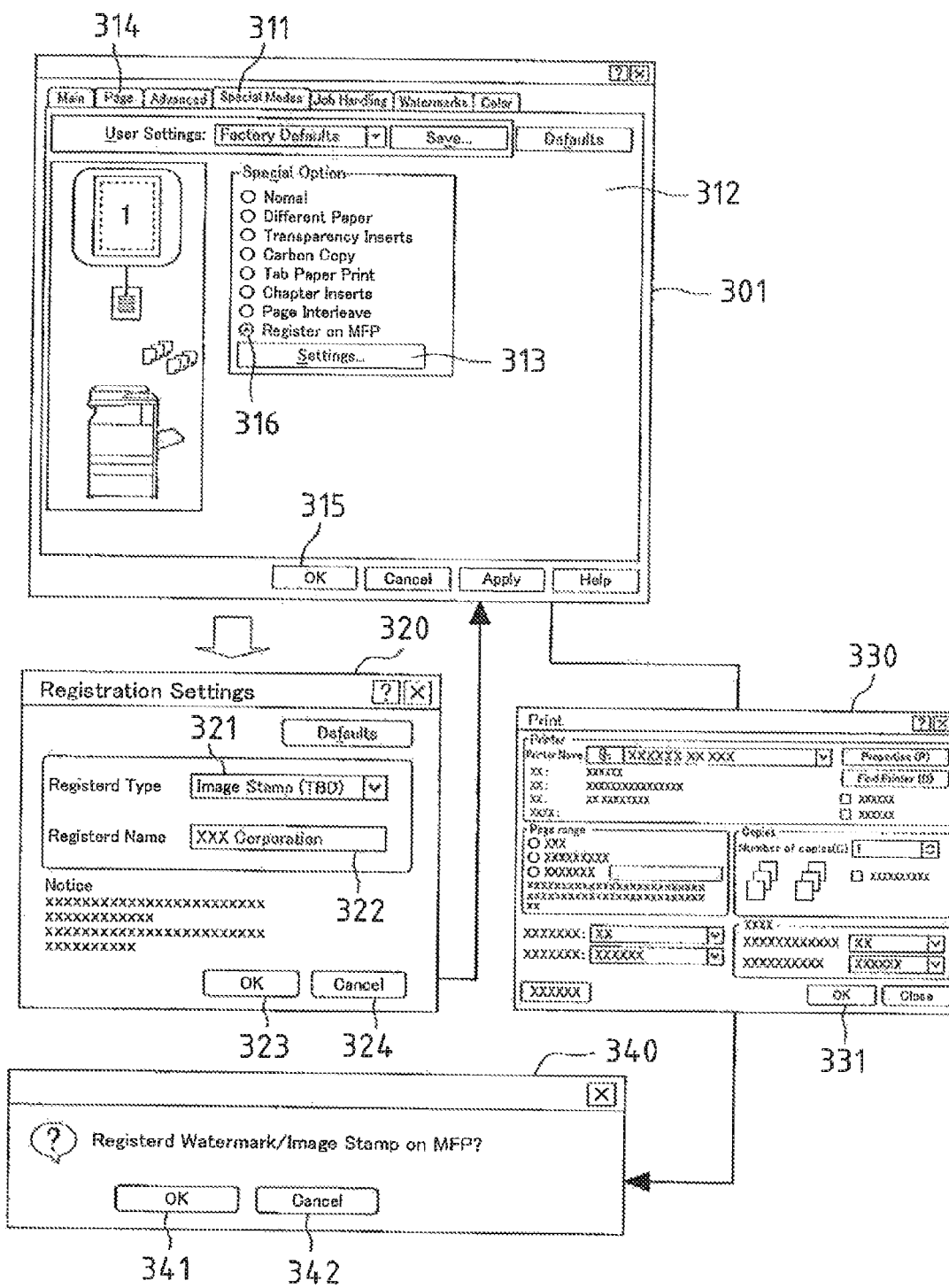
FIG. 6 is a diagram showing how a window displayed on a screen of a display device transitions when a stamp image is set, in the printing system according to the first embodiment.

First, when a tab 311 in the window 301 shown in FIG. 6 displayed on the display device 119 is selected through an operation of the operation input unit 117, the printer driver 133 displays, on the window 301, a page 312 for registering a stamp image. Then, when a user stamp button 313 provided in the page 312 has been pressed (specified) through an operation of the operation input unit 117, or in other words, when input has been performed using the user stamp button 313 (step S401), processing by the stamp image setting unit 133a is executed (the CPU 111 launching the stamp image setting program), and a process for registering a stamp image created using an application program 132 starts.

Subsequently, when a radio button 316 has been checked and an OK button 316 has been pressed (specified) through an operation of the operation input unit 117, the stamp image setting unit 133a displays a pop-up screen 320 as shown in FIG. 6 on the display device 119. The pop-up screen 320 includes a selection box 321 for selecting either (the type of stamp image) of a watermark that is translucently combined with the original image and an image stamp that is opaquely combined with the original image, a box 322 for entering the registration name of a stamp image (for example, the name for identifying a stamp image or the name of a file containing a stamp image), an OK button 323, a cancellation button 324, and the like. When either a watermark or image stamp (the type of stamp image) has been selected with the selection box 321 through an operation of the operation input unit 117 (step S402), the registration name of a stamp image has been entered in the box 322 (step S403), and the OK button 323 of the pop-up screen 320 has been pressed (specified) through an operation of the operation input unit 117 (step S404), then in response thereto, the stamp image setting unit 133a records the type of stamp image and the registration name in the RAM 115 of the PC 11, in association with the stamp image. The stamp image setting unit 133a also obtains the size of the stamp image and records the obtained size in the RAM 115, in association with the stamp image. For example, the stamp image setting unit 133a receives the size of the stamp image from the application program 132, and records it in the RAM 115.

Furthermore, the pop-up screen 320 shown in FIG. 6 may also include a plurality of other boxes such as a box for entering a user name and a box for entering the date of registration. In this case, when a user name, the date of registration and the like have been entered in the boxes and the OK button 323 has been pressed (specified), then in response thereto, the stamp image setting unit 133a records not only the type, registration name and size of the stamp image, but also the user name and the date of registration of the stamp image in the RAM 115 of the PC 11, in association with the stamp image.

At this time, in the case where a watermark that is translucently combined with the original image has been selected, the stamp image needs to be set to monochrome. Because a watermark is printed directly on the original image in overlaying relationship, if the watermark is a color image, the amount of toner per unit area of recording paper will be excessively large, causing a toner adhesion failure. If the watermark is a monochrome image, the amount of toner per unit area of recording paper will be suppressed, and thus no toner adhesion failure will occur.

For this reason, in the case where a stamp image created using an application program 132 is a color image, the PC 11 displays a pop-up screen (not shown) for specifying the color (monochrome) of the stamp image on the display device 119. When the color of the stamp image has been specified in the pop-up screen through an operation of the operation input unit 117, the PC 11 changes the color of the color stamp image to the specified color to generate a monochrome stamp image, and registers the generated stamp image in the RAM 115. Then, the PC 11 causes the display device 119 to end display of the pop-up screen for specifying the color of the stamp image.

Subsequently, when the OK button 323 of the pop-up screen 320 has been pressed (specified), the PC 11 causes the display device 119 to end display of the pop-up screen 320, and again displays the window 301 shown in FIG. 6 on the display device 119. Furthermore, when the OK button 315 of the window 301 has been pressed (specified) through an operation of the operation input unit 117, the PC 11 causes the display device 119 to end display of the window 301, and displays a print setting page 330 as shown in FIG. 6 on the display device 119. The print setting page 330 is used to specify the number of prints and the pages that are to be printed when an original image is transmitted from the PC 11 to an MFP 21 so as to be printed on recording paper by the MFP 21. In this example, a description will be given assuming that an OK button 331 of the print setting page 330 is pressed (specified) through an operation of the operation input unit 117 without the default settings shown in the print setting page 330 being changed. When the OK button 331 of the print setting page 330 has been pressed (specified) through an operation of the operation input unit 117, the PC 11 causes the display device 119 to end display of the print setting page 330, and displays a pop-up screen 340 as shown in FIG. 6 on the display device 119 (step S405). A message asking whether to transmit and register the stamp image to and in the MFP 21 is displayed on the pop-up screen 340. Accordingly, even if the processing from step S401 to step S405 is executed due to misoperation of the operation input unit 117, transmission and registration of a stamp imago due to misoperation can be prevented by the pop-up screen 340.

Here, when an OK button 341 of the pop-up screen 340 has been pressed (specified) through an operation of the operation input unit 117, then in response thereto, the stamp image setting unit 133*a* reads out the stamp image, the type, the registration name, the size, the user name, the date of registration and the like that have been recorded in the RAM 115, and converts the stamp image, the type, the registration name, the size, the user name, the date of registration and the like into PDL data, and transmits the PDL data to the MFP 21 via the data transmission/reception unit 134. The PC 11 shown in FIG. 2 transmits the PDL data from the communication I/F 122 to the MFP 21 via the network N (step S406: transmitting step).

When a cancellation button 342 of the pop-up screen 340 has been pressed (specified) through an operation of the operation input unit 117, the PC 11 ends the process shown in FIG. 7 without transmitting the stamp image and the like.

Next, in the MFP 21, the PDL data of the stamp image is received by the communication I/F 227. The received PDL data is analyzed and the stamp image is expanded by the PDL data processing unit 233. Then, the type of stamp image, the registration name, the size, the user name, the date of registration and the like that correspond to the stamp image are extracted.

In the case where the type of stamp image that was extracted is a watermark to be translucently combined with an original image, the MFP 21 compresses the stamp image (monochrome), records the compressed stamp image on the HDD 224, and records the type of stamp image, the registration name, the size, the user name, the date of registration and the like on the HDD 224, in association with the stamp image.

Specifically, in the MFP 21, a lossy compression process (JPEG compression process) is performed on the stamp image (monochrome: RGB data) by the image processing-unit 236 to generate JPEG data of the stamp image, records the generated JPEG data of the stamp image on the HDD 224, and records the type of stamp image, the registration name, the size, the user name, the date of registration and the like on the HDD 224, in association with the stamp image.

The process for compressing and recording a stamp image as described above is exactly the same as the process for compressing and recording original image data (hereinafter referred to simply as an "original image") from the PC 11.

In the case where the type of stamp image that was extracted is an image stamp to be opaquely combined with an original image, the MFP 21 generates mask image data (hereinafter referred to simply as a "mask image") corresponding to the stamp image, compresses the stamp image and the generated mask image and records the compressed stamp image and mask image on the HDD 224, and records the type of stamp image, the registration name, the size, the user name, the date of registration and the like on the HDD 224 in association with the stamp image.

Specifically, the image processing unit 236 generates a mask image (binary image) having the same pixel matrix as the stamp image by determining, with respect to each pixel of the stamp image, whether the pixel is a colored pixel based on the stamp image (RUB data), and setting, if the pixel is determined to be a colored pixel, the value of the pixel in the mask image to "0", and if the pixel is determined to be not a colored pixel the value of the pixel in the mask image to "1".

It is assumed here that, for example, a total of 24 bits including 8 bits (0 to 255) indicating 256 red intensity levels, 8 bits (0 to 255) indicating 256 green intensity levels and 8 bits indicating 256 blue intensity levels are assigned to each pixel of the stamp image. In this case, a threshold value $(255-\alpha)$ for the red intensity level, a threshold value $(255-\beta)$ for the green intensity level and a threshold value $(255-\gamma)$ for the blue intensity level are set. Then, for each pixel of the stamp image, if at least one of the red intensity level, the green intensity level and the blue intensity level is less than or equal to the corresponding threshold value (red intensity level≤ $(255-\alpha)$, green intensity level≤$(255-\beta)$, blue intensity level≤ $(255-\gamma)$), the pixel is determined to be a colored pixel and the value of the pixel in the mask image is set to "0". If all of the red intensity level, the green intensity level and the blue intensity level exceed the respective threshold values, the pixel is determined to be not colored pixel and the value of the pixel in the mask image is set to "1". Through this processing, a value of "0" is set for the colored pixels of the stamp image in the mask image, and a value of "1" is set for the pixels of the stamp image that are white or nearly white in the mask image.

Figure 8:
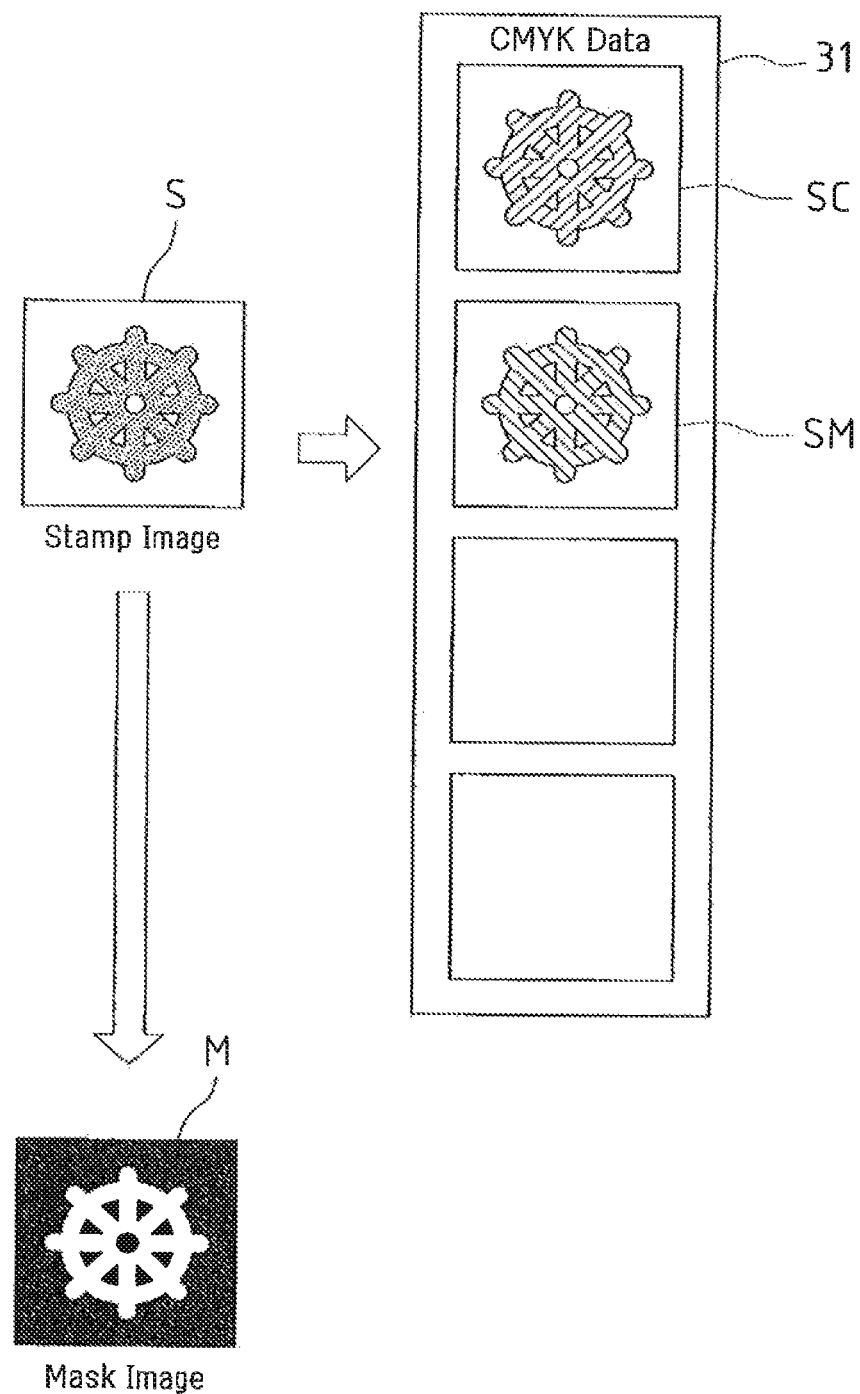
FIG. 8 is an illustrative diagram illustrating a stamp image, a mask image corresponding to the stamp image, and CMYK data of the stamp image.

FIG. 8 shows a stamp image (image stamp) S indicated by RGB data and a mask image M generated based on the stamp image S. The stamp image S is a color image constituted by colored pixels and white or nearly white pixels. The mask image M has the same pixel matrix as the stamp image S, and the mask image M is generated by setting a value of "0" for the pixels of the mask image M that correspond to colored pixels of the stamp image S and a value of "1" for the pixels of the mask image M that correspond to white or nearly white pixels of the stamp image S.

The size of the mask image generated in the manner described above matches the size of the stamp image and thus matches the size of recording paper.

Then, the image processing unit 236 performs a lossless compression process (JBIG compression process) on the mask image to generate JBIG data of the mask image, and records the JBIG data of the mask image on the HDD 224. The image processing unit 236 also performs a lossy compression process (JPEG compression process) on the stamp image (RGB data) to generate JPEG data of the stamp image, records the JPEG data of the stamp image on the HDD 224, and records the type of stamp image, the registration name, the size, the user name, the date of registration and the like on the HDD 224, in association with the stamp image.

As described above, in the case where the type of the stamp image received from the PC 11 is a watermark to be translucently combined with an original image, the MFP 21 performs a JPEG compression process on the stamp image (monochrome), records the stamp image on the HDD 224, and records the type of stamp image, the registration name, the size, the user name, the date of registration and the like on the HDD 224, in association with the stamp image.

In the case where the type of the stamp image received, from the PC 11 is an image stamp to be opaquely combined with an original image, the MFP 21 generates a mask image, performs a JBIG compression process on the generated mask image, records the JPEG data of the mask image on the HDD 224. The MFP 21 also performs a JPEG compression process on the stamp image (color), records the JPEG data of the stamp image on the HDD 224, and records the type of stamp image, the registration name, the size, the user name, the registration name and the like on the HDD 224, in association with the stamp image.

As described above, after a stamp image has been created using an application program 132 (stamp image creating step), the PC 11 launches the printer driver 133, specifically, the stamp image setting unit 133a, sets the size of stamp image, the type, the registration name, the user name, the date of registration and the like, converts the stamp image, the size, the type, the registration name, the user name, the date of registration and the like into PDL data, and transmits the PDL data to an MFP 21 (transmitting step). The MFP 21 analyzes the PDL data to generate a stamp image. In the case where the type of the stamp image is a watermark, the MFP 21 performs a JPEG compression process on the stamp image (monochrome), records the JPEG data of the stamp image on the HDD 224, and records the type of stamp image, the registration name, the size, the user name, the date of registration and the like that correspond to the stamp image on the HDD 224 (recording step). In the case where the type of the stamp image is an image stamp, the MFP 21 generates a mask image, performs a JBIG compression process on the mask image, and records the JBIG data of the mask image on the HDD 224. The MFP 21 also performs a JPEG compression process on the stamp image (color), records the JPEG data of the stamp image on the HDD 224, and records the type of stamp image, the registration name, the size, the user name, the date of registration and the like on the HDD 224, in association with the stamp image (recording step).

The generation and registration of a stamp image performed by the PC 11 and the MFP 21 in the manner described above can be implemented by any combination of the PCs 11 and the MFPs 21 shown in FIG. 1. Also, because a variety of stamp images can be generated using the application programs 132, and there is no special limitation of the number of stamp images that can be registered in the MFP 21, and therefore various types of stamp images can be registered in the MFP 21. Also, because stamp images and display information thereof can be collectively created on the PC 11 side, it is unnecessary to create display information on the MFP 21 side.

The user name, the date of registration and the like may be registered on the HDD 224 by performing an input operation on the MFP 21 side, or in other words, through an input operation of the operation input unit 215.

Figure 9:
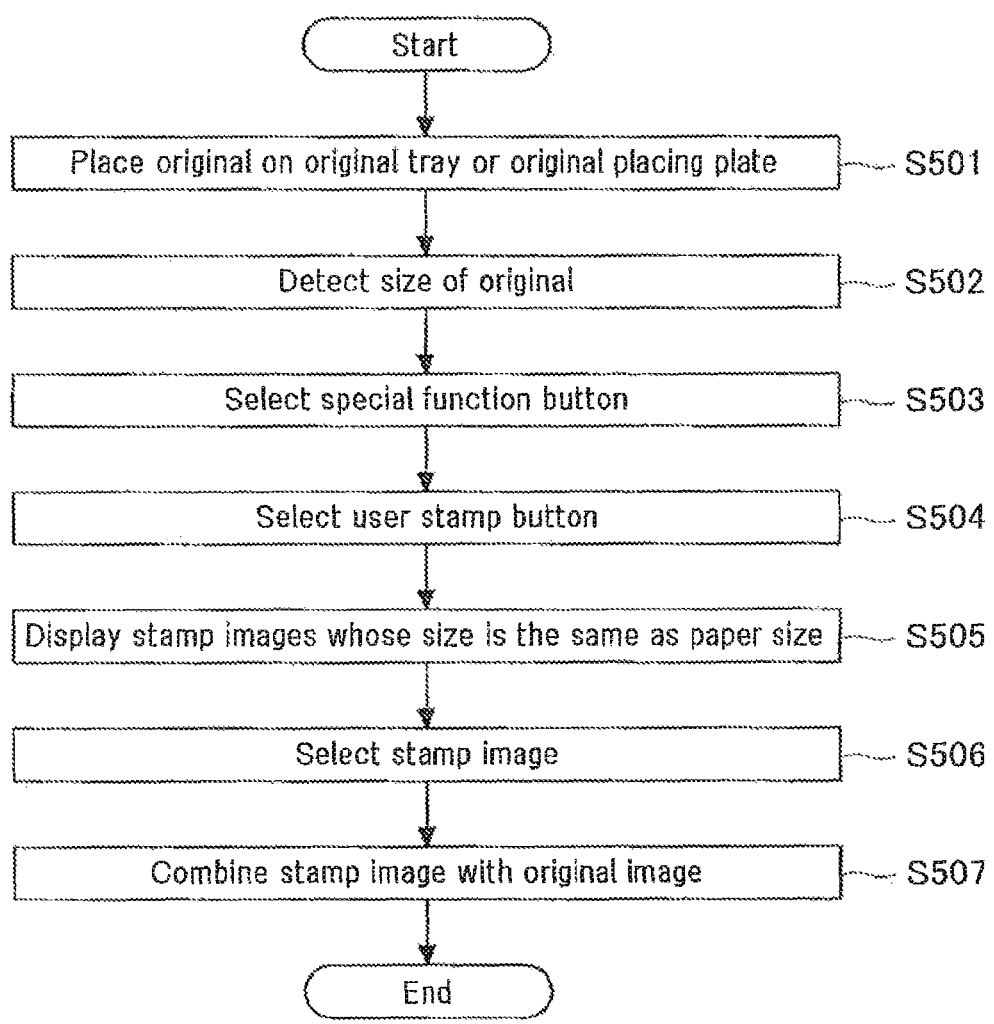
FIG. 9 is a flowchart illustrating a process for combining an original image and a stamp image executed by the multifunction peripheral included in the printing system according to the first embodiment.

Next, a procedure for selecting a stamp image registered in the MFP 21 and combining the stamp image with the original image when copying is performed by the MFP 21 will be described with reference to the flowchart shown in FIG. 9.

First, when the user places at least one sheet of an original (a sheet of recording paper on which an original image has been recorded) on the original tray or the original placing plate of the MFP 21 (step S501), the CPU 221 acquires the size of the original detected by the original size detection unit 238 (step S502), references the paper size data table stored on the HDD 224, and obtains the standard size of recording paper that is the same as the size of the original. Alternatively, the CPU 221 references the paper size data table stored on the HDD 224, and obtains the standard size of recording paper specified through an input operation of the operation input unit 215. Then, the CPU 221 performs a stamp image selecting-process based on the input operation of the operation input unit 215 performed by the user.

If the standard size of recording paper that is the same as the size of the original or the standard size of recording paper specified by the input operation is not recorded in the paper size data table, it means none of the paper feed cassettes contain recording paper of that size, and thus the CPU 221 displays a message prompting the user to load recording paper of that size on the display screen of the operation input unit 215.

Figure 10:
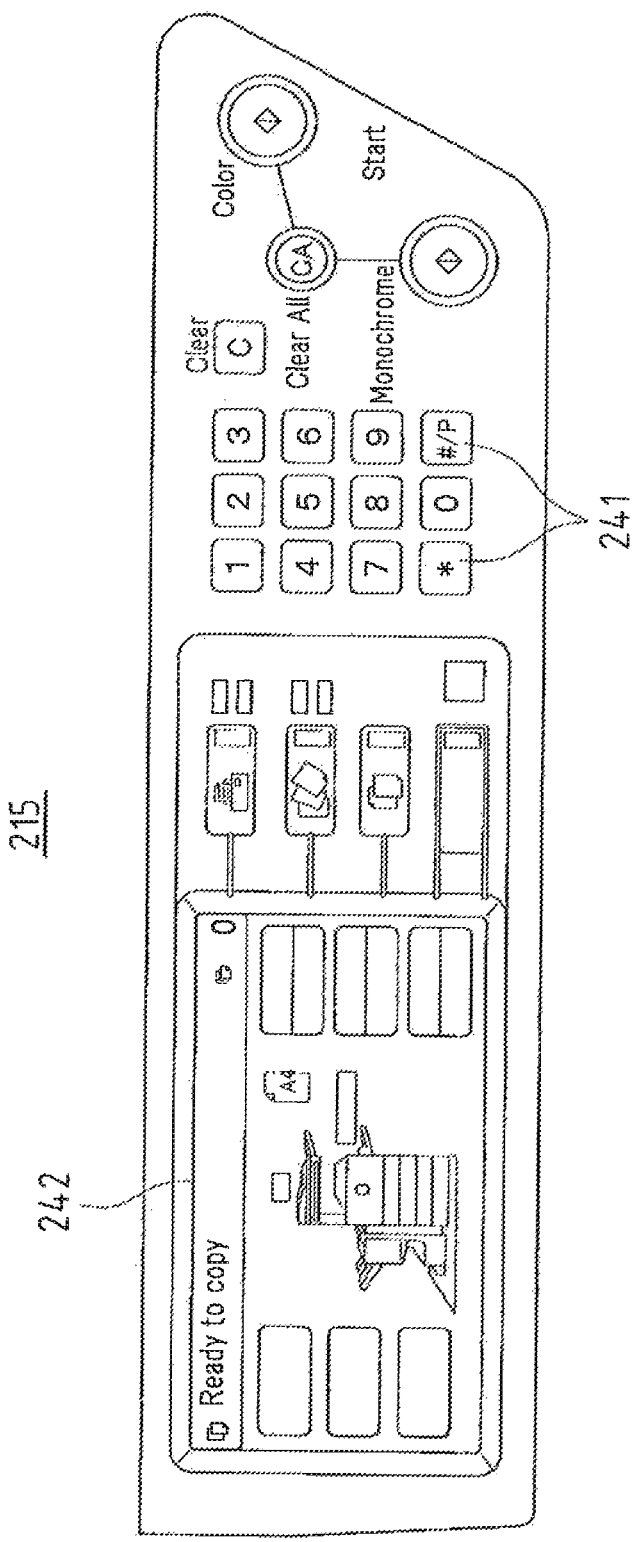
FIG. 10 is a plan view showing an example of an operation input unit of the multifunction peripheral included in the printing system according to the first embodiment.

The operation input unit 215 includes a plurality of operation keys 241 and a display screen 242 of a liquid crystal display device as shown in FIG. 10. The display screen 242 is a touch panel screen. An operation guidance or the like is displayed on the display screen 242 by display control by the CPU 221. The display of the operation guidance or the like on the display screen 242 is interactively switched. Also, execution of various types of processes can be instructed to the image control unit 211 (CPU 221) through an operation of the operation keys 241 of the operation input unit 215 or an operation of keys displayed on the display screen 242.

Figure 11A:
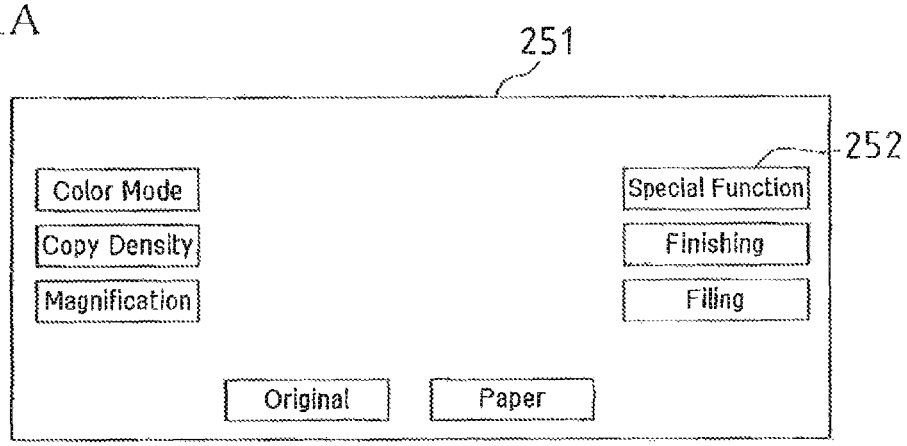
FIG. 11A is a diagram showing a basic page displayed on a display screen of the multifunction peripheral included in the printing system according to the first embodiment.
Figure 11B:
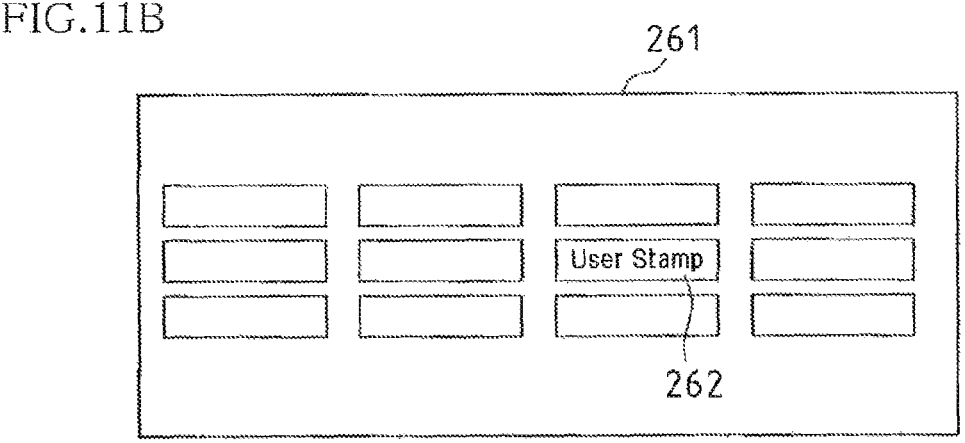
FIG. 11B is a diagram showing a special function setting page displayed on the display screen of the multifunction peripheral included in the printing system according to the first embodiment.
Figure 11C:
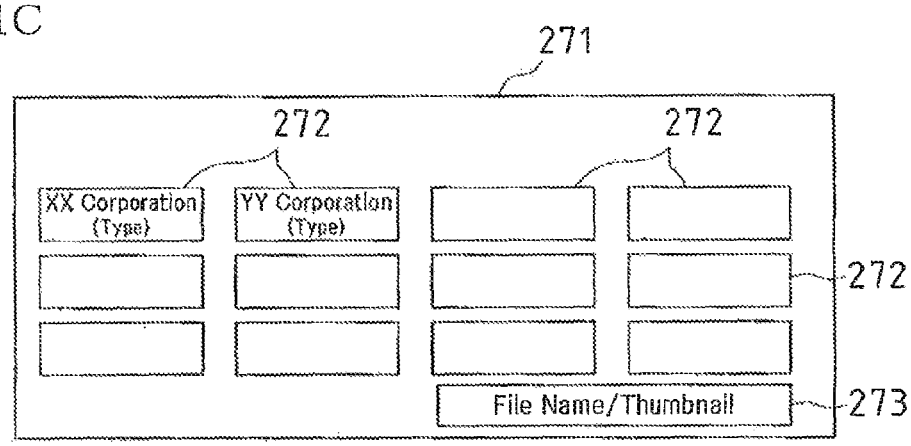
FIG. 11C is a diagram showing a stamp image list page displayed on the display screen of the multifunction peripheral included in the printing system according to the first embodiment.

For example, the CPU 221 displays a basic page 251 as shown in 11A on the display screen 242 of the operation input unit 215. Then, in the basic page 251 shown in FIG. 11A, when a special function button 252 has been pressed (specified) through an operation of the operation input unit 215 (step S503), the CPU 221 displays a special function setting page 261 as shown in FIG. 11B on the display screen 242. Then, in the special function setting page 261 shown in FIG. 11B when a user stamp button 262 has been pressed (specified) through an operation of the operation input unit 215 (step S504), the CPU 221 displays a stamp image list page 271 as shown in FIG. 11C on the display screen 242 (step S505: displaying step).

In the displaying step the CPU 221 references the size of a plurality of stamp images registered on the HDD 224, and extracts stamp images whose size corresponds to the standard size that is the same as the size of the original determined in step S502 or whose size corresponds to the standard size specified through an input operation of the operation input unit 215. Then, the type, the registration name, the size, the user name, the date of registration and the like that correspond to each extracted stamp image are read out from the HDD 224, and the stamp image list page 271 containing a list of buttons 272 that correspond to the respective extracted stamp images and a display switching button 273 is displayed on the display screen 242. In the stamp image list page 271, each button 272 shows the registration name (for example, the name for identifying the stamp image or the name of a file containing the stamp image) and the type.

For example, if the standard size that is the same as the size of the original determined in step S502 or the standard size specified through the input operation is a standard size of A4, the CPU 221 extracts stamp images having a standard size of A4 from among a plurality of stamp images registered on the HDD 224, and displays the stamp image list page 271 containing a list of buttons 272 that correspond to the stamp images having a standard size of A4 on the display screen 242.

In the stamp image list page 271, each button 272 and the registration name and the type displayed on the button 272 are display information corresponding to the stamp image, and therefore the user of the MFP 21 can recognize the stamp image from the display information.

Figure 12A:
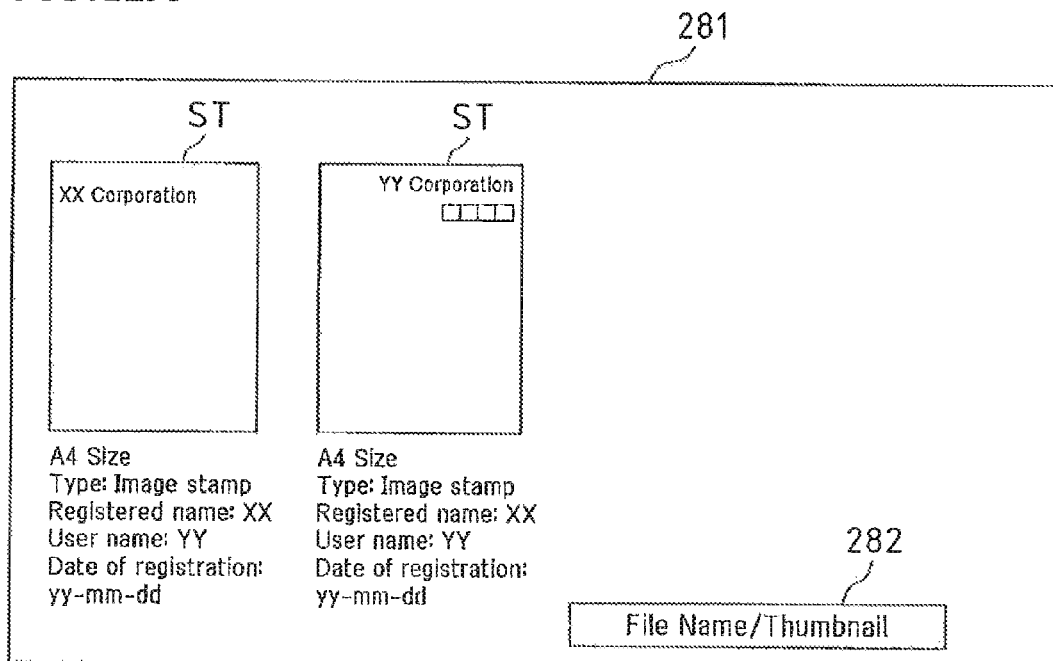
FIG. 12A is a diagram showing an example of a stamp image selecting page displayed on the display screen of the multifunction peripheral included in the printing system according to the first embodiment.

In the stamp image list page 271, when the display switching button 273 has been pressed (specified) through an operation of the operation input unit 215, the CPU 221 displays a thumbnail list page 281 as shown in FIG. 12A on the display screen 242. In the thumbnail list page 281, stamp images ST whose size corresponds to the standard size of recording paper that is the same as the size of the original determined in step S502 are displayed as thumbnails, and the type of stamp image, the registration name, the size, the user name, the date of registration and the like are attached to the thumbnail of each stamp image ST.

The thumbnail, the registration name, the size, the user name and the date of registration are also display information corresponding to a stamp image, and therefore the user of the MFP 21 can recognize the stamp image from the display information.

In the thumbnail list page 281, when a display switching button 282 has been pressed (specified) through an operation of the operation input unit 215, the CPU 221 displays the stamp image list page 271 on the display screen 242. The stamp imago list page 271 and the thumbnail list page 281 can thereby be switched and displayed by the display switching button 273 or 282 being pressed (specified).

In the stamp image list page 271, the registration name and type of each stamp image are neatly displayed. Accordingly, the user of the MFP 21 can view stamp images and the registration name, size, user name, date of registration and the like of the stamp images on the thumbnail list page 281.

In the stamp image list page 271 or the thumbnail list page 281, when any of the buttons (registration names) 272 or the thumbnails of the stamp images has been selected (specified) through an operation of the operation input unit 215, the CPU 221 selects a stamp image corresponding to the selected (specified) button 272 or thumbnail as a stamp image tube combined with the original image (step S506: selecting step).

After that, when an instruction to start copying the original has been issued through an operation of the operation input unit 215, in response to an instruction from the CPU 221, the scanner 212 starts reading the original image (reading step), and thereby a copying process performed by the MFP 21 starts. Through the copying process, the original image is read by the scanner 212, and the read original image (RGB data) is input into the image control unit 211 from the scanner 212 via the scanner I/F 235. Then, the original image input into the image control unit 211 is subjected to a lossy compression process (JPEG compression process) in the image processing unit 236, and the processed original image (JPEG data) is written into the HDD 224.

The original image written into the HDD 224 and the stamp image having the standard size selected in step S506 are temporarily stored in a page memory (a memory in the HDD 224 or the image memory 237). When the original image and the stamp image have been stored in the page memory as described above, the image processing unit 236 combines the stamp image with the original image on the page memory and forms a composite image (step S507: combining step).

The process for combining an original image and a stamp image performed by the image processing unit 236 differs depending on whether the stamp image is a watermark or image stamp.

In the case where the stamp image is a watermark to be translucently combined with an original image, the image processing unit 236 overlays the stamp image directly on the original image so as to combine the stamp image and the original image and forms a composite image.

Figure 13:
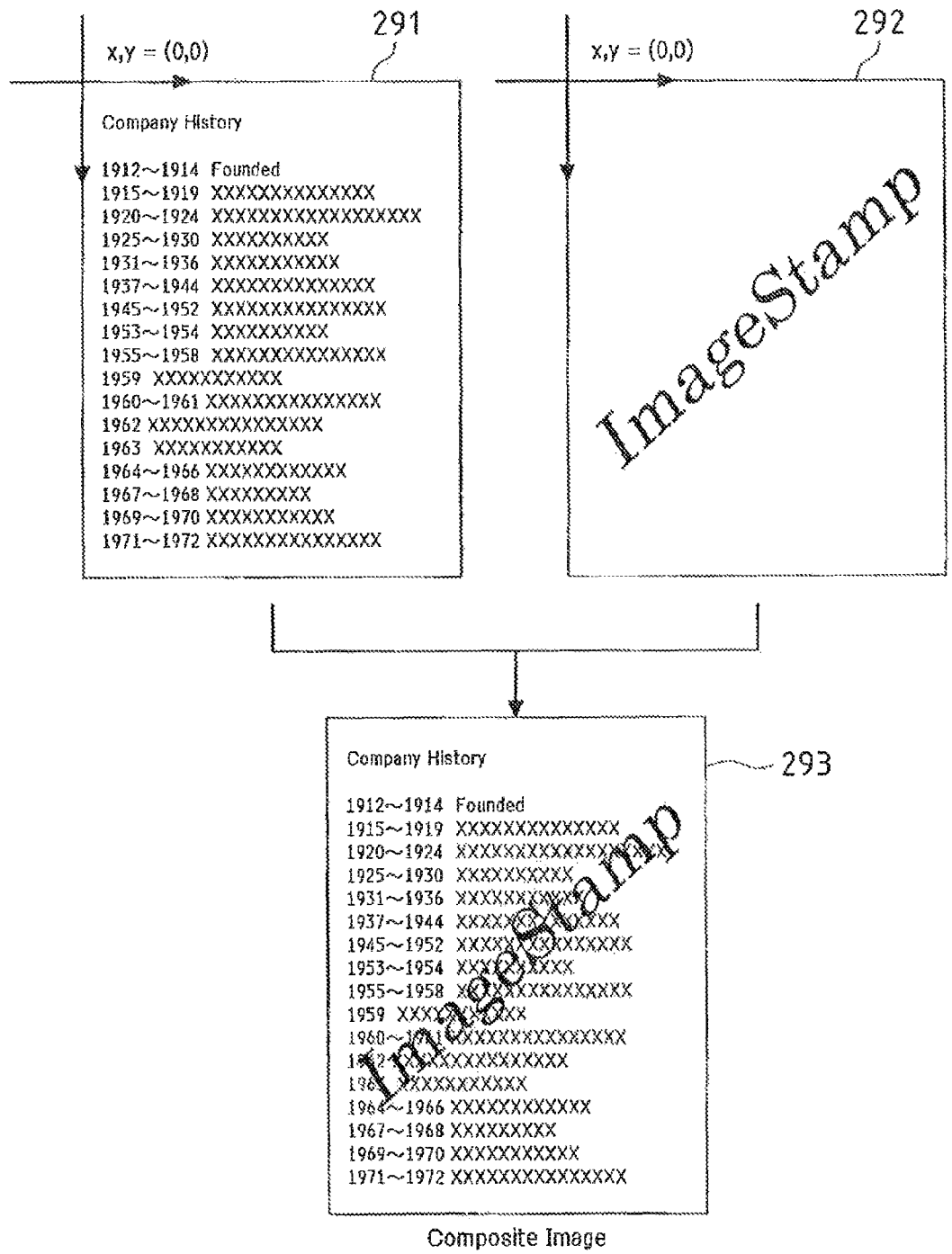
FIG. 13 is an illustrative diagram illustrating a method for combining an original image and a stamp image in overlaying relationship executed in the printing system according to the first embodiment.

For example, if the size of an original image 291 is the same as the standard size, as shown in FIG. 13, a region corresponding to the standard size is formed in the page memory, in the region, one corner of the region is aligned with the corresponding corner of the original image 291 (x, y=(0, 0)), and the intensity level of each pixel is written in the x and y directions. Subsequently, one corner of the region is aligned with the corresponding corner of a stamp image 292 (x, y=(0, 0)), the intensity level of each pixel of the stamp image 292 is written in the x and y directions by adding it to the intensity level of the corresponding pixel of the original image 291. In other words, for each pair of such overlapping pixels, the intensity level of one pixel is added to the intensity level of the other pixel, and the resulting sums are written as the intensity levels of the pixels of a composite image 293.

Even when the size of the original image 291 is different from the standard size, a region corresponding to the standard size is formed in the page memory. In the region, the original image 291, and the stamp image 292 are overlapped, and the intensity level of each pixel of the stamp image 292 is written by adding it to the intensity level of the corresponding pixel of the original image 291. For example, a region corresponding to a standard size of A3 is formed in the page memory. In the region, one corner of the region is aligned with the corresponding corner of an original image 291 having a standard size of A4 (x, y=(0, 0)), and the intensity level of each pixel of the original image 291 is written in the x and y directions. Subsequently, one corner of the region is aligned with the corresponding corner of a stamp image 292 having a standard size of A3 (x, y=(0, 0)), and the intensity level of each pixel of the stamp image 292 is written in the x and y directions by adding it to the intensity level of the corresponding pixel of the original image 291, and the intensity levels of the remaining pixels of the stamp image 292, which are outside the original image 291, are set as is.

Specifically the image processing unit 236 reads out JPEG data of the original image from the HDD 224, decompresses the JPEG data of the original image to generate RGB data of the original image, and converts the RGB data of the original image into CMYK data to generate CMYK data of the original image. Also, the image processing unit 236 reads out JPEG data of the selected stamp image from the HDD 224, decompresses the JPEG data of the stamp image to generate RGB data of the stamp image (monochrome), and converts the RGB data of the stamp image into CMYK data (indicating intensity levels of only one of cyan, magenta, yellow and black) to generate CMYK data of the stamp image. Then, the image processing unit 236 overlays each pixel of the original image and the corresponding pixel of the stamp image in the page memory for each of cyan, magenta, yellow and black. For each pair of overlapping pixels, the intensity level of one pixel and the intensity level of the other pixel are added up, and the resulting sums are determined as the intensity levels of the pixels of the composite image CMYK data of the composite image is thereby generated. The CMYK data of the composite image is output to the printer 213 via the printer I/F 234.

Figure 14:
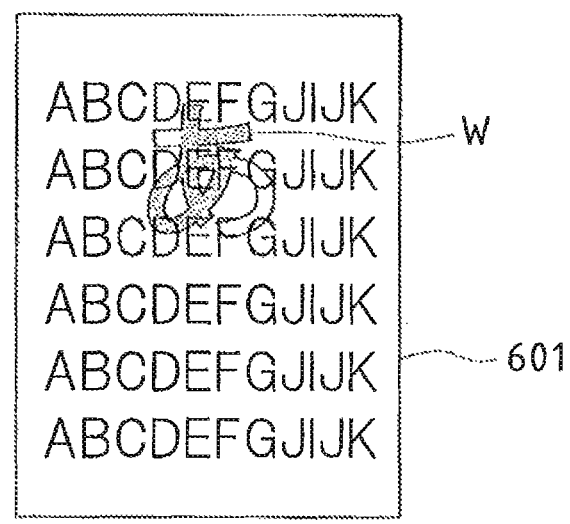
FIG. 14 is a diagram showing an example of a composite image obtained by combining a stamp image (watermark) with an original image.

Upon receiving from the CPU 221 an instruction to feed paper from the paper feed cassette containing recording paper whose standard size is the same as the size of the original determined in step S502, or from the paper feed cassette containing recording paper whose standard size was specified through an input operation of the operation input unit 215, the auto paper selection unit 228 feeds recording paper having that standard size from the paper feed cassette specified by the instruction to the printer 213. The printer 213 prints the composite image (the composite image formed in the combining step) indicated by the CMYK data on the fed recording paper (printing step). FIG. 14 is a diagram showing an example of a composite image 601 in which a watermark W has been combined with an original image.

In the case where the stamp image is an image stamp to be opaquely combined with an original image, the image processing unit 236 forms a composite image by combining a mask image with the original image and combining the stamp image therewith. In this case as well, a region corresponding to the standard size is formed in the page memory. In this region, one corner of the region, the corresponding corner of the original image, the corresponding corner of the stamp image and the corresponding corner of the mask image are aligned such that the pixels of the original image, the pixels of the stamp image and the pixels of the mask image are overlapped in the x and y directions. Then, for each pair of overlapping pixels, processing is performed in which the pixel of the original image is replaced by a blank pixel of the mask image and the intensity level of the pixel of the original image that has been replaced by a blank pixel is replaced by the intensity level of the pixel of the stamp image, and thereby the mask image is combined with the original image.

Specifically, the image processing unit 286 reads out JPEG data of the original image from the HDD 224, decompresses the JPEG data of the original image to generate RGB data of the original image, and converts the RGB data of the original image into CMYK data to generate CMYK data of the original image. Also, the image processing unit 236 reads out JPEG data of the selected stamp image from the HDD 224, and decompresses the JPEG data of the stamp image to generate RGB data of the stamp image, and converts the RGB data of the stamp image into monochrome CMYK data to generate CMYK data of the stamp image. Furthermore, the image processing unit 236 reads out JBIG data of the mask image from the HDD 224, and decompresses the JBIG data of the mask image to form a mask image (binary image). Then, the image processing unit 236 overlays each pixel of the original image, the corresponding one of the stamp image and the corresponding one of the mask image, for each of CMYK on the page memory and then performs, on each pair of overlapping pixels, processing in which the pixel of the original image is replaced by a blank pixel of the mask image, and the intensity level of the blank pixel of the original image is replaced by the intensity level of the pixel of the stamp image. CMYK data of a composite image is thereby generated. The CMYK data of the composite image is output to the printer 213 via the printer I/F 234.

Upon receiving from the CPU 221 an instruction to feed paper from the paper feed cassette containing recording paper whose standard size is the same as the size of the original determined in step S502, or from the paper feed cassette containing recording paper whose standard size was specified through an input operation of the operation input unit 215, the auto paper selection unit 228 feeds recording paper having that standard size from the paper feed cassette specified by the instruction to the printer 213. The printer 213 prints the composite image (the composite image formed in the combining step) indicated by the CMYK data on the fed recording paper (printing step).

FIG. 8 conceptually shows CMYK data converted from RGB data of the stamp image ((image stamp) S. Here, CMYK data 31 of the stamp image S includes a cyan (C) stamp image component SC and a magenta (M) stamp image component SM.

Figure 15:
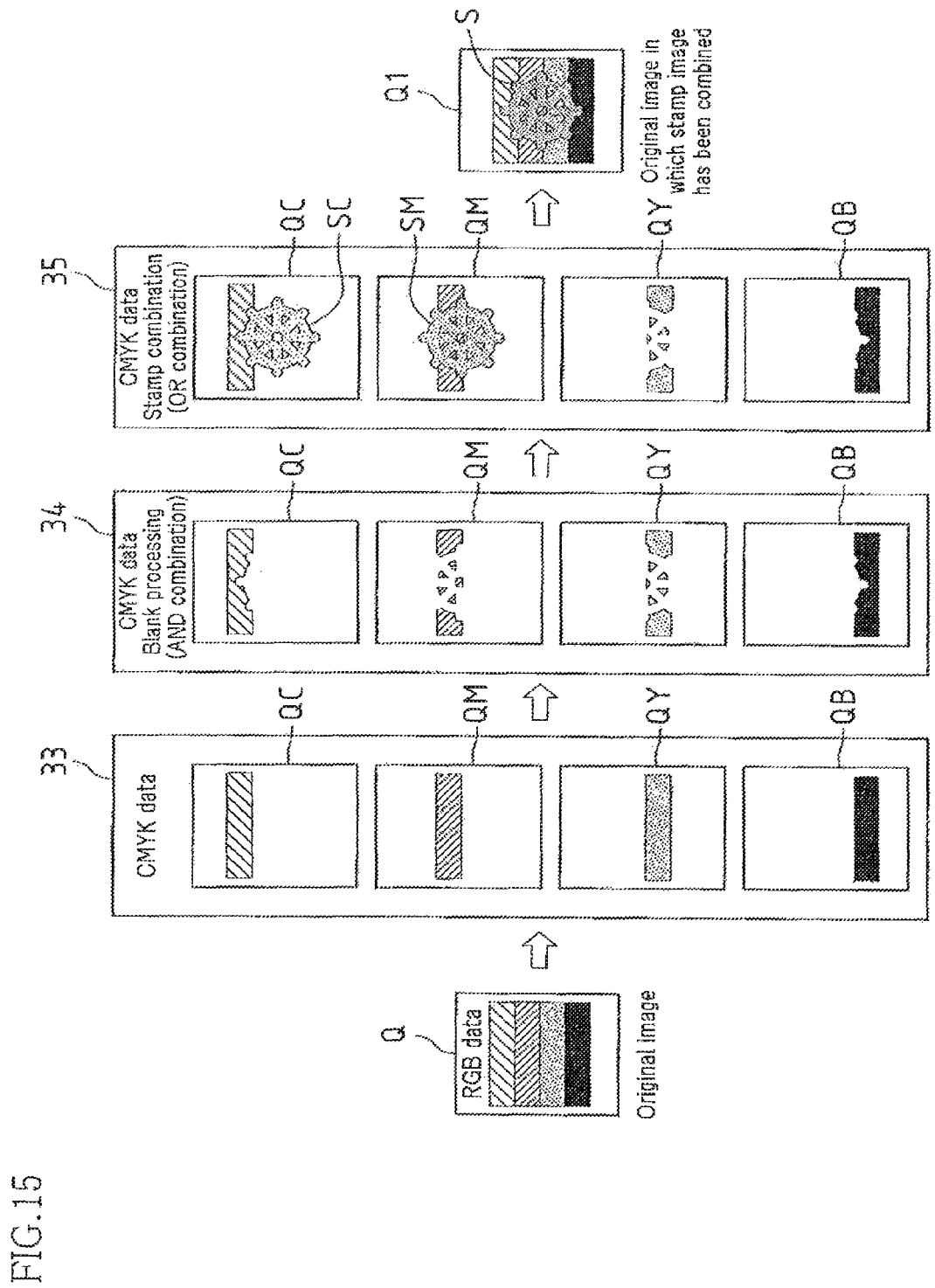
FIG. 15 is a diagram showing an example of an original image, CMYK image components constituting the original image, CMYK image components with which a mask image has been combined. CMYK image components with which a stamp image (image stamp) has been combined, and a composite image in which the original image and the stamp image have been combined.

FIG. 15 conceptually shows RGB data of an original image Q, CMYK data 33 converted from the RGB data of the original image Q, CMYK data 31 of the original image Q with which a mask image M has been combined, CMYK data 35 of a composite image in which the stamp image S has been combined, and a composite image Q1 in which the stamp image S has been combined.

As shown in FIG. 15, the original image Q (RGB data) is converted to a cyan (C) original image component QC, a magenta (M) original image component QM, a yellow (Y) original image component QY and a black (B) original image component QB (CMYK data 33).

The cyan original image component QC, the magenta original image component QM, the yellow original image component QY and the black original image component QB are AND combined with the mask image M. An operation table for the AND combination is shown in FIG. 16.

As described earlier, a value of "0" has been set for pixels of the mask image M that correspond to colored pixels of the stamp image S, and therefore in each of the cyan original image component QC, the magenta original image component QM, the yellow original image component QY and the black original image component QB, white is set for the pixels corresponding to the pixels of the mask image M through AND combination, and the region overlapping the mask image M is made white. Likewise, a value of "1" has been set for pixels of the mask image that correspond to white or nearly white pixels of the stamp image, and therefore, in each of the cyan original image component QC, the magenta original image component QM, the yellow original image component QY and the black original image component QB, colored pixels (cyan, magenta or yellow) corresponding to the pixels of the mask image M are maintained through AND combination. Through this processing, a cyan original image component QC, a magenta original image component QM, a yellow original image component QY and a black original image component QB, each of which has been combined with the mask image (white region), are generated, or in other words, an original image Q in which the mask image M has been combined is generated (CMYK data 34).

Then, in the white region of the mask image M in the obtained original image Q, the stamp image S shown in FIG. 8 is combined (CMYK data 35). In this example, the stamp image S shown in FIG. 8 is made up of only the cyan stamp image component SC and the magenta stamp image component SM, and therefore, the cyan original image component QC is combined with the cyan stamp image component SC, and the magenta original image component QM is combined with the magenta stamp image component SM.

Furthermore, the cyan composite image component QC, the magenta composite image component QM, the yellow composite image component QY and the black composite image component QB that are indicated by the CMYK data 35 are printed on recording paper in overlaying relationship, and thereby a composite image Q1 in which the stamp image S has been combined is printed.

As described above, the MFP 21 references the size of a plurality of stamp images registered in the HDD 224, and extracts stamp images whose size is the same as the standard size of recording paper on which an original image is to be recorded. Then, the MFP 21 displays, on the display screen 242, a list of buttons 272 or thumbnails that correspond to the respective extracted stamp images (watermarks and image stamps). When a button, thumbnail or the like is selected (specified) through an operation of the operation input unit 215, a stamp image corresponding to the specified button or thumbnail is selected, the stamp image and the original image are combined, and the obtained composite image is recorded on recording paper. Accordingly, the character strings, graphics and the like that constitute the stamp image are recorded on recording paper in an appropriate size and layout.

Also, in the MFP 21, the stamp images that can be selected through an operation of the operation input unit 215 are limited to stamp images whose size is the same as the size of recording paper by displaying only display information corresponding to stamp images whose size is the same as the size of recording paper on the display screen 242. If display information corresponding to stamp images of all sizes stored on the HDD 224 are displayed on the display screen 242, it is not possible to allow the user to identify stamp images corresponding to recording paper, or in other words, stamp images that can be combined with the original image without missing a part (for example, characters, graphics or the like) that should be displayed, and unexpected print results and waste of paper may occur. However, with the MFP 21 of the first embodiment, as described above, the stamp images that can be selected through an operation of the operation input unit 215 are limited to stamp images whose size is the same as the size of recording paper by displaying only display information corresponding to stamp images whose size is the same as the size of recording paper on the display screen 242, and therefore a situation will not occur in which the user selects a stamp image that does not correspond to the size of recording paper, or in other words, a stamp image that may be combined with the original image with a part of the stamp image missing. Accordingly, the occurrence of unexpected print results and waste of paper can be prevented.

Next, a variation of the procedure for selecting and combining a stamp image performed by the MVP 21 will be described. According to the first embodiment described above, the size of an original is detected, stamp images whose size is the same as the standard size of recording paper on which the original image is to be recorded are extracted, and a list of buttons 272 or thumbnails that correspond to the respective extracted stamp images is displayed on the display screen 242. However, according to the variation, a list of buttons 272 or thumbnails that correspond to all stamp images is displayed, and the size of an original is detected afterwards. Then, stamp images having a standard size that is different from the size of the original are extracted, and the buttons 272 or thumbnails corresponding to the extracted stamp images are removed, as a result of which only the buttons 272 or thumbnails that correspond to the stamp images whose size is the same as the standard size of recording paper on which the original image is to be recorded can be displayed.

Figure 17:
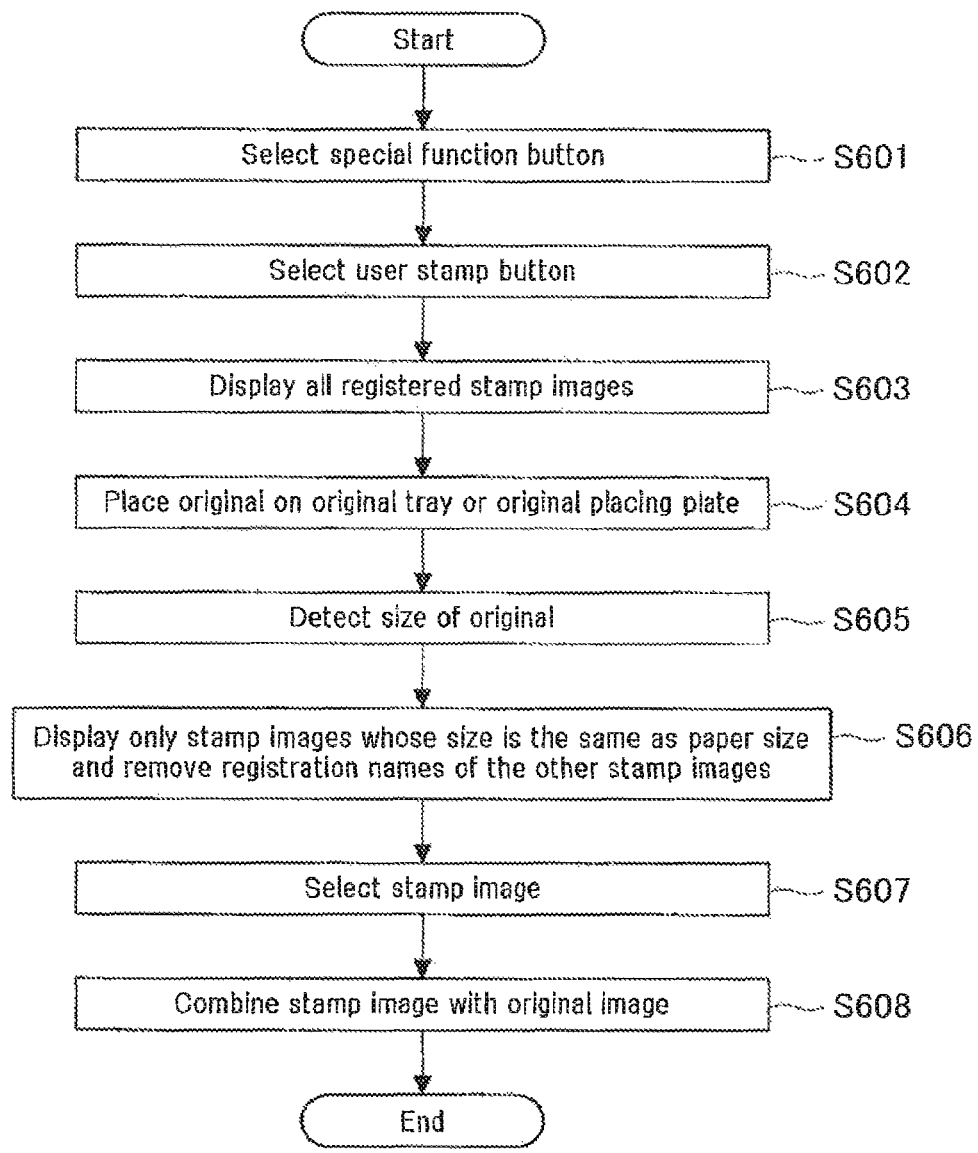
FIG. 17 is a flowchart illustrating a variation of the process for combining an original image and a stamp image executed by the multifunction peripheral included in the printing system according to the first embodiment.

A variation of procedure for selecting and combining a stamp image will be described with reference to the flowchart shown in FIG. 17.

Figure 19A:
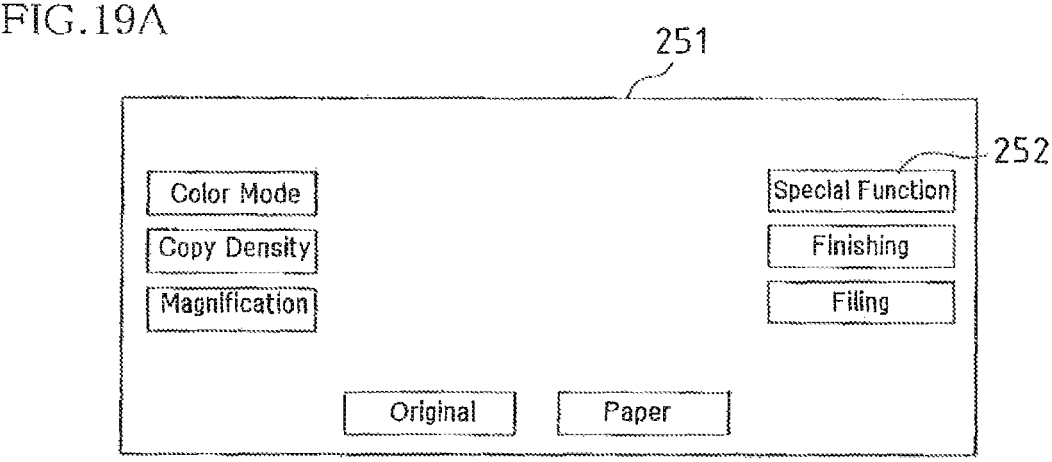
FIG. 19A is a diagram showing an example of a basic page displayed on the display screen of the multifunction peripheral when the combining process shown in the flowchart of FIG. 17 or 18 is performed.
Figure 19B:
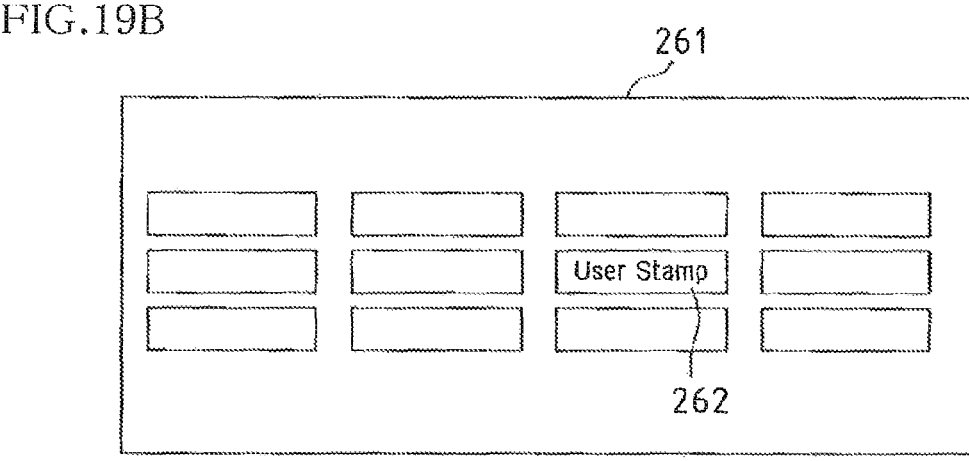
FIG. 19B is a diagram showing an example of a special function setting page displayed on the display screen of the multifunction peripheral when the combining process shown in the flowchart of FIG. 17 or 18 is performed.
Figure 19C:
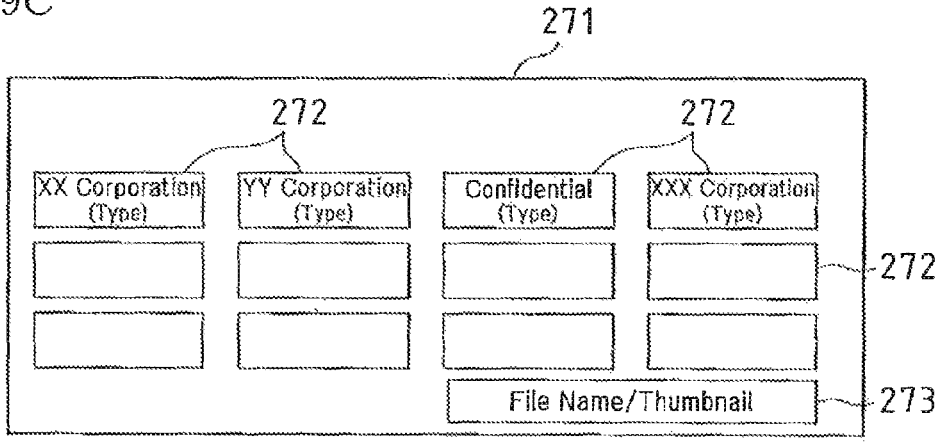
FIG. 19C is a diagram showing an example of a stamp image list page displayed on the display screen of the multifunction peripheral when the combining process shown in the flowchart of FIG. 17 or 18 is performed.

First, it is assumed that a basic page 251 as shown in FIG. 19A is displayed on the display screen 242 of the operation input unit 215. In this state, in the basic page 251 shown in FIG. 19A, when a special function button 252 has been pressed (specified) through an operation of the operation input unit 215 (step S601), the CPU 221 displays a special function setting page 261 as shown in FIG. 19B on the display screen 242. Then, in the special function, setting page 261 shown in FIG. 19B, when a user stamp button 262 has been pressed (specified) through an operation of the operation input unit 215 (step S602), the CPU 221 displays a stamp image list page 271 as shown in FIG. 19C on the display screen 242 (step S603: displaying step).

In this displaying step, the CPU 221 reads out, from the HDD 224, the type, the registration name, the size, the user name, the date of registration and the like of all stamp images registered on the HDD 224, and displays a stamp image list page 271 containing a list of buttons 272 corresponding to all of the stamp images and a display switching button 273 on the display screen 242. If the buttons 272 corresponding to all of the stamp images cannot be displayed in the stamp image list page 271, a scroll bar (not shown) may be provided on a side of the stamp image list page 271 so that the buttons 272 corresponding to all of the stamp images can be scroll displayed through an operation of the scroll bar.

Figure 12B:
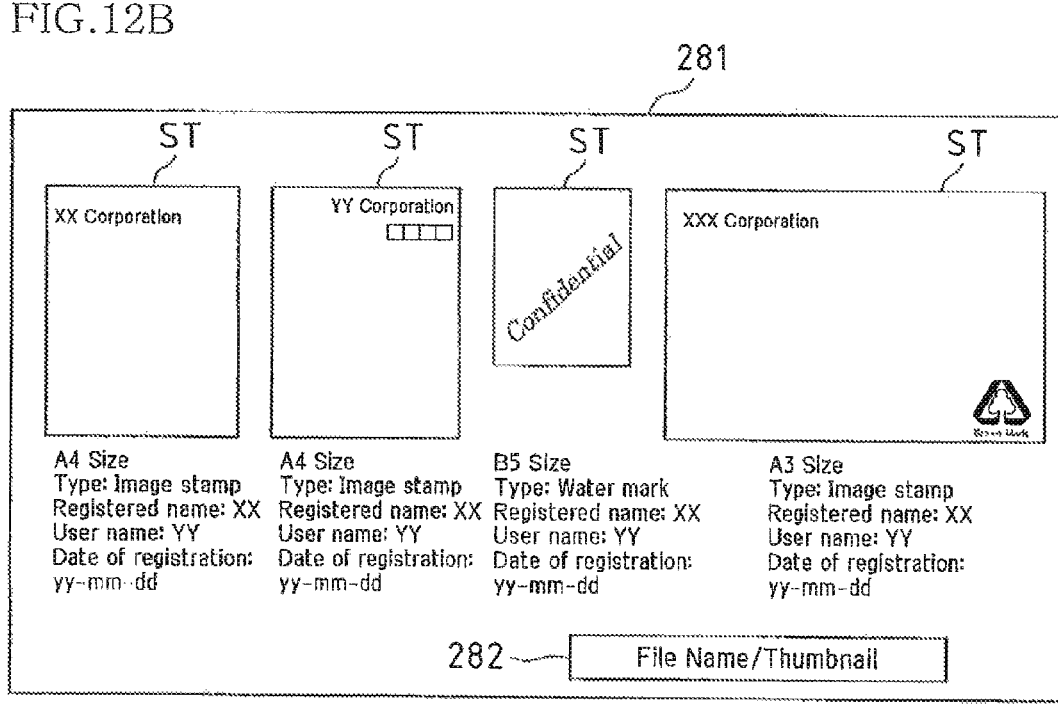
FIG. 12B is a diagram showing another example at a stamp image selecting page displayed on the display screen of the multifunction peripheral included in the printing system according to the first embodiment.

In this stamp image list page 271, when the display switching button 273 has been pressed (specified) through an operation of the operation input unit 215, the CPU 221 displays a thumbnail list page 281 as shown in FIG. 12B on the display screen 242. In the thumbnail list page 281, all of the stamp images ST registered on the HDD 224 are displayed as thumbnails, and the type of stamp image, the registration name, the size, the user name, the date of registration and the like are attached to the thumbnail of each stamp image ST. In the thumbnail list page 281 as well, if all of the stamp images ST cannot be thumbnail displayed, a scroll bar (not shown) may be provided so that all of the thumbnails of the stamp images ST can be scroll displayed through an operation of the scroll bar.

In the thumbnail list page 281, when a display switching button 282 has been pressed (specified) through an operation of the operation input unit 215, the CPU 221 displays the stamp image list page 273 on the display screen 242. The stamp image list page 271 and the thumbnail list page 281 can thereby be switched and displayed by the display switching button 273 or 282 being pressed (specified).

After that, when at least one sheet of an original (a sheet of recording paper on which an original image has been recorded) is placed on the original tray or the original placing plate of the MFP 21 (step S604), the CPU 221 acquires the size of the original detected by the original size detection unit 238 (step S605), references the paper size data table stored on the HDD 224, and obtains the standard size of recording paper that is the same as the size of the original. Alternatively, the CPU 221 references the paper size data table, and obtains the standard size of recording paper specified through an input operation of the operation input unit 215. Then, the CPU 221 extracts stamp images having a standard size that is different from the obtained standard size, and performs display control such that a stamp image list page 271 in which buttons 272 corresponding to the extracted stamp images have been removed and a thumbnail list page 281 in which thumbnails of the extracted stamp images ST have been removed are displayed on the display screen 242 (step S606).

As a result, as shown in FIG. 11C, a stamp image list page 271 containing only buttons 272 that correspond to the stamp images whose size is the same as the standard size of the recording paper on which the original image is to be recorded is displayed on the display screen 242. Also, as shown in FIG. 12A, a thumbnail list page 281 containing only thumbnails of the stamp images ST whose size is the same as the standard size of recording paper on which the original image is to be recorded is displayed on the display screen 242.

In this state, in the stamp image list page 271 or the thumbnail list page 281, when any of the buttons (registration names) 272 or the thumbnails of the stamp images has been specified through an operation of the operation input unit 215, the CPU 221 selects a stamp image corresponding to the specified button 272 or thumbnail as a stamp image to be combined with the original image (step S607: selecting step).

Subsequently, when an instruction to start copying the original has been issued through an operation of the operation input unit 215, in response to an instruction from the CPU 221, the scanner 212 starts reading the original image (reading step), and thereby a copying process performed by the MFP 21 starts. Through the copying process, the original image is read by the scanner 212, and the read original image (RGB data) is input into the image control unit 211 from the scanner 212 via the scanner I/F 235. Then, the original image input into the image control unit 211 is subjected to a lossy compression process (JPEG compression process) in the image processing unit 236, and the processed original image (JPEG data) is written into the HDD 224.

Then, the original image written into the HDD 224 and the stamp image having the standard size selected in step S607 are temporarily stored in the page memory. When the original image and the stamp image have been stored in the page memory as described above, the image processing unit 236 combines the stamp image with the original image on the page memory and forms a composite image (step S608: combining step). The composite image is output to the printer 213 via the printer I/F 234.

Upon receiving from the CPU 221 an instruction to feed paper from the paper feed cassette containing recording paper whose standard size is the same as the size of the original determined in step S605, or from the paper feed cassette containing recording paper whose standard size was specified through an input operation of the operation input unit 215, the auto paper selection unit 228 feeds recording paper having that standard size from the paper feed cassette specified by the instruction to the printer 213. The printer 213 acquires the composite image formed on the page memory (the composite image formed in the combining step), and prints the composite image on the fed recording paper (printing step).

As described above, in the processing performed by the MFP 21 according to the variation, buttons and thumbnails that correspond to all stamp images registered on the HDD 224 are temporarily displayed on the display screen 242, and stamp images having a standard size that is different from the standard size of recording paper on which the original image is to be recorded are extracted from among all of the stamp images registered on the HDD 224. Then, buttons 272 corresponding to the extracted stamp images are removed from the stamp image list page 271 displayed on the display screen 242. Also, thumbnails corresponding to the extracted stamp images ST are removed from the thumbnail list page 281 displayed on the display screen 242. Accordingly, only a list of buttons 272 or thumbnails that correspond to stamp images whose size is the same as the standard size of recording paper on which the original image is to be recorded is displayed on the display screen 242, and thus even when any of the buttons or thumbnails is selected, the size of the stamp image always matches the standard size of recording paper, and the character strings, graphics and the like that constitute the stamp image are recorded on recording paper in an appropriate size and layout. If display information corresponding to stamp images of all sizes stored on the HDD 224 are displayed on the display screen 242, it is not possible to allow the user to identify stamp images corresponding to recording paper, or in other words, stamp images that can be combined with the original image without missing a part (for example, characters, graphics or the like) that should be displayed, and unexpected print results and waste of paper may occur. However, with the processing performed by the MFP 21 according to the variation, only a list of buttons 272 or thumbnails that correspond to stamp images whose size is the same as the standard size of recording paper on which the original image is to be recorded is eventually displayed on the display screen 242, and therefore a situation will not occur in which the user selects a stamp image that does not correspond to the size of recording paper, or in other words, a stamp image that may be combined with the original image with a part of the stamp image missing. Accordingly, the occurrence of unexpected print results and waste of paper can be prevented.

A printing system according to a second embodiment of the present invention will be described next. The printing system of the second embodiment includes constituent elements similar to those of the printing system of the first embodiment shown in FIGS. 1 to 4, and stamp images and display information (thumbnails, registration name, size, user name and the date of registration) are transmitted from the PC 11 to the MFP 21 and registered by the procedure described with reference to FIGS. 6 and 7. However, the procedure for selecting and combining a stamp image performed by the MFP 21 is different from those of the first embodiment and the variation described above.

According to the second embodiment, the CPU 221 displays a list of buttons 272 or thumbnails corresponding to all stamp images on the display screen 242. After that, if a stamp image whose size does not correspond to the standard size of recording paper on which the original Image is to be recorded has been selected, combining of the original image and the stamp image performed by the image processing unit 236 is prohibited (in other words, an instruction to form a composite image is not issued to the image processing unit 236). If on the other hand, a stamp image whose size is the same as the standard size of recording paper on which the original image is to be recorded has been selected, the CPU 221 instructs the image processing unit 236 to form a composite image, and the stamp image is combined with the original image.

Figure 18:
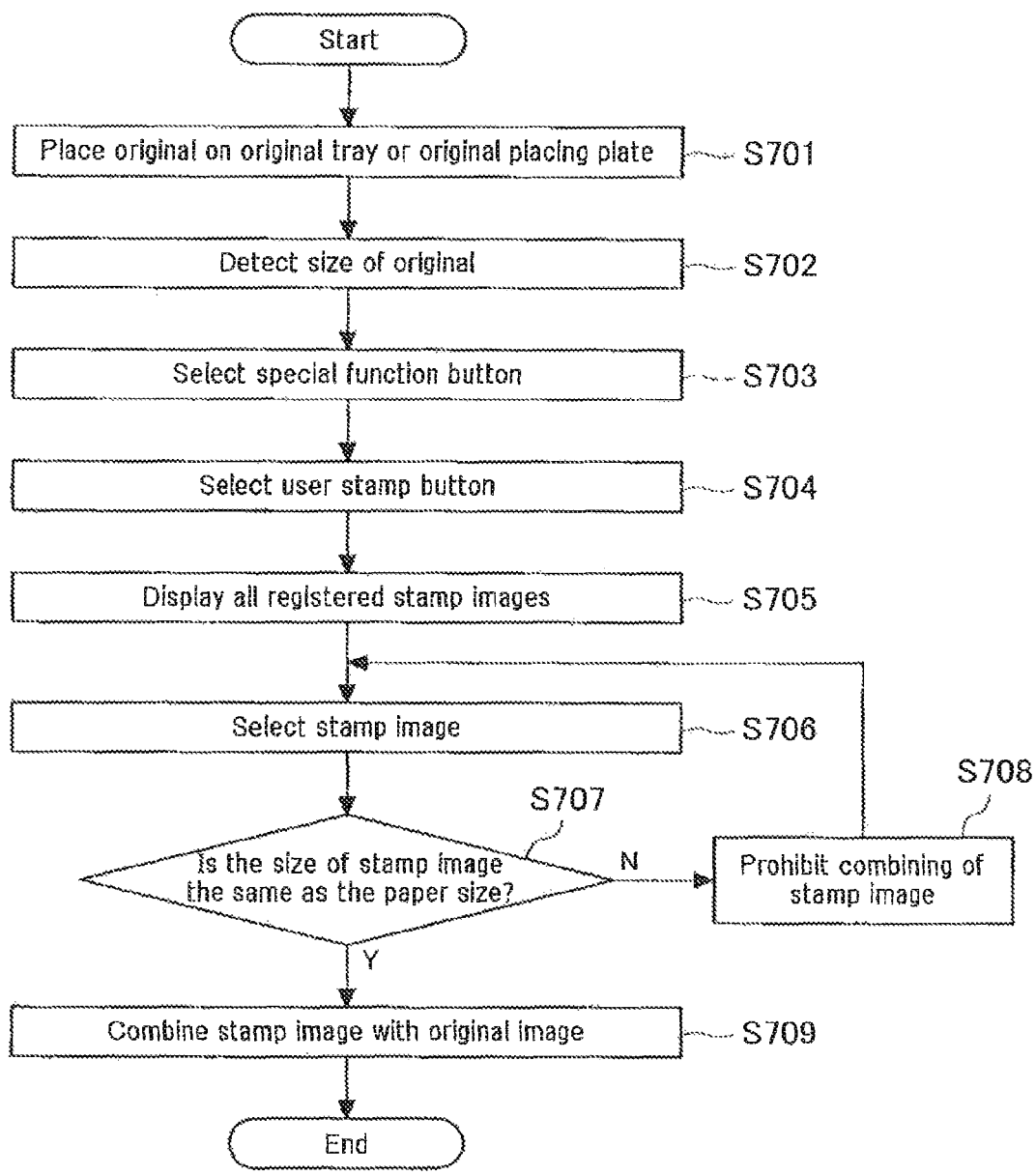
FIG. 18 is a flowchart illustrating a process for combining an original image and a stamp image executed by a multifunction peripheral included in a printing system according to a second embodiment.

The procedure for selecting and combining a stamp image according to the second embodiment will be described with reference to the flowchart shown in FIG. 18.

First, when at least one sheet of an original (a sheet of recording paper on which an original image has been recorded) is placed on the original tray or the original placing plate of the MFP 21 (step S701), the CPU 221 acquires the size of the original detected by the original size detection unit 235 (step S702), references the paper size data table stored on the HDD 224, and obtains the standard size of recording paper that is the same as the size of the original. Alternatively the CPU 221 references the paper size data table, and obtains the standard size of recording paper specified through an input operation of the operation input unit 215.

Also, the CPU 221 displays a basic page 251 as shown in FIG. 19A on the display screen 242 of the operation input unit 215. Then, in the basic page 251 shown in FIG. 19A, when a special function button 252 has been pressed (specified) through an operation of the operation input unit 215 (step S703), the CPU 221 displays a special function setting page 261 as shown in FIG. 19B on the display screen 241. Then, in the special function setting page 261 shown in FIG. 19B, when a user stamp button 262 has been pressed (specified) through an operation of the operation input unit 215 (step S704), the CPU 221 displays a stamp image list page 271 as shown in FIG. 19C on the display screen 242 (step S705: displaying step).

In this displaying step, the CPU 221 reads out, from the HDD 224, the type, the registration name, the size, the user name, the date of registration and the like of all stamp images registered on the HDD 224 and displays a stamp image list page 271 containing a list of buttons 272 corresponding to all of the stamp images and a display switching button 273 on the display screen 242 of the operation input unit 215. When the display switching button 273 has been pressed (specified), the CPU 221 displays a thumbnail list page 281 as shown in FIG. 12B on the display screen 242. In the thumbnail list page 281, all of the stamp images ST registered on the HDD 224 are displayed as thumbnails, and the type of stamp image, the registration name, the size, the user name, the date of registration and the like are attached to the thumbnail of each stamp image ST.

When, in the thumbnail list page 281, the display switching button 282 has been pressed (specified) through an operation of the operation input unit 215, the CPU 221 displays the stamp image list page 271 on the display screen 242. The stamp image list page 271 and the thumbnail list page 281 can thereby be switched and displayed by pressing (specifying) the display switching button 273 or 282.

In this state, in the stamp image list page 271 or the thumbnail list page 281, when any of the buttons (registration names) 272 or the thumbnails of the stamp images has been specified through an operation of the operation input unit 215, the CPU 221 selects a stamp image corresponding to the specified button 272 or thumbnail as a stamp image to be combined with the original image (step S706: selecting step).

Then, the CPU 221 compares the size of the selected stamp image with the standard size that is the same as the size of the original determined in step S702 or the standard size of recording paper specified through an input operation of the operation input unit 215 (step S707). If the size of the selected stamp image matches the standard size ("Yes" in step S707), a message indicating that the stamp image can be combined is displayed on the display screen 242.

After that, when an instruction to start copying the original has been issued through an operation of the operation input unit 215, in response to an instruction from the CPU 221, the scanner 212 starts reading the original image (reading step), and thereby a copying process performed by the MFP 21 starts. Through the copying process, the original image is read by the scanner 212, and the read original image (RGB data) is input into the image control unit 211 from the scanner 212 via the scanner I/F 235. Then, the original image input into the image control unit 211 is subjected to a loss compression process (JPEG compression process) in the image processing unit. 236, and the original image (JPEG data) is written into the HDD 224.

The original image written into the HDD 224 and the stamp image whose size is the same as the standard size of the recording paper are temporarily stored in the page memory. When the original image and the stamp image have been stored in the page memory, the image processing unit 236 combines the stamp images with the original image on the page memory, and forms a composite image (step S709: combining step). The composite image is output to the printer 213 via the printer 234.

Upon receiving from the CPU 221 an instruction to feed paper from the paper feed cassette containing recording paper whose standard size is the same as the size of the original determined in step S702, or from the paper feed cassette containing recording paper whose standard size was specified through an input, operation of the operation input unit 215, the auto paper selection unit 228 feeds recording paper having that standard size from the paper feed cassette specified by the instruction to the printer 213. The printer 213 acquires the composite image formed on the page memory (or in other words, the composite image formed in the combining step), and prints the composite image on the fed recording paper (printing step).

If, on the other hand, the size of the stamp image selected in step 3706 does not match the standard size that is the same as the size of the original determined in step S702 or the standard size of recording paper specified through an input operation of the operation input unit 215 (No in step S707), the CPU 221 prohibits combining the stamp image with the original image without starting a copying process even if an instruction to start copying the original has been issued through an operation of the operation input unit 215 (step S708: prohibiting step) and displays a message indicating that the stamp image cannot be combined on the display screen 242. The procedure returns to step S706, where the CPU 221 waits for another stamp image to be selected.

As described above, with the MFP 21 of the second embodiment, buttons and thumbnails that correspond to all stamp images registered on the HDD 224 are temporarily displayed on the display screen 242. If a stamp image whose size does not correspond to the standard size of recording, paper on which the original image is to be recorded has been selected, combining of the original image and the stamp image is prohibited. If, on the other hand, a stamp image whose size is the same as the standard size of recording paper on which the original image is to be recorded has been selected, the stamp image is combined with the original image, and therefore, the character strings, graphics and the like that constitute the stamp image are recorded on recording paper in an appropriate size and layout. Accordingly, the occurrence of unexpected print results and waste of paper can be prevented.

Preferred embodiments and variations of the present invention have been described above with reference to the accompanying drawings, but the present invention is not limited to the examples given above. It is apparent that those skilled in the art can conceive various variations and modifications within the scope of the claims, and such variations and modifications also fail within the technical scope of the present invention.

That is, the present invention can be embodied and practiced in other different forms without departing from the spirit and essential characteristics thereof. Therefore, the above-described working example is considered in all respects as illustrative and not restrictive. The scope of the invention is indicated by the appended claims rather than by the foregoing description. All variations and modifications falling within the equivalency range of the appended claims are intended to be embraced therein.

DESCRIPTION OF REFERENCE NUMERALS

11 PC (Personal Computer)
21 MFP (Multifunction Peripheral)
111, 221 CPU
112, 222 Bus
113, 223 ROM
114, 224 HDD
115, 225 RAM
116, 226 Input I/F
117, 215 Operation Input. Unit
118 Display VP
119 Display Device
122, 297 Communication I/F
131 Operating System
132 Application Program
133 Printer Driver
133a Stamp. Image Setting Unit
134 Data Transmission/Reception Unit
135 Utility Program
211 Image Control Unit
212 Scanner (Reading Device)
213 Printer
228 Auto Paper Selection Unit
229 Recording Paper Size Determining Unit
233 PDL Data Processing Unit
234 Printer I/F
235 Scanner I/F
236 Image Processing Unit
237 Image Memory
238 Original Size Detection Unit
241 Operation Key
249 Display Screen

What is claimed is:
1. A printing system configured such that a computer and an image forming apparatus can be connected via a network, the computer setting a stamp image and transmitting the set stamp image to the image forming apparatus via the network, the image forming apparatus comprising:

a reading device that reads an original image;

a storage unit that stores the stamp image received from the computer;

an image combining unit that reads out at least one stamp image from the storage unit, combines the stamp image with the original image read by the reading device, and forms a composite image; and a printing unit that prints the composite image on recording paper, wherein the image combining unit generates a mask image based on the stamp image, forms a white region in the original image using the generated mask image, and combines the stamp image with the white region thus formed.

2. The printing system according to claim 1, wherein the image forming apparatus comprises a display unit that displays display information corresponding to at least one stamp image stored in the storage unit, and the image combining unit reads out, from the storage unit, at least one stamp image whose display information is displayed on the display unit, combines the stamp image with the original image read by the reading device, and forms a composite image.

3. The printing system according to claim 2, wherein the image forming apparatus comprises a control unit that reads out, from the storage unit, at least one stamp image whose size is the same as a size of recording paper on which the original image read by the reading device is to be recorded and that displays at least one piece of display information corresponding to the read stamp image on the display unit.

4. The printing system according to claim 2, wherein the image forming apparatus comprises a control unit that selects at least one stamp image whose display information is displayed on the display unit and that prohibits the image combining unit from forming a composite image if a size of the selected stamp image does not match a size of recording paper on which the original image read by the reading device is to be recorded.

5. The printing system according to claim 2, wherein the computer sets a stamp image and display information corresponding to the stamp image and transmits the set stamp image and display information to the image forming apparatus via the network, and in the image forming apparatus, the storage unit stores the stamp image and display information received from the computer in association with each other, and the display unit displays at least one stamp image and display information stored in the storage unit.

6. The printing system according to claim 1, wherein the computer sets an image that is translucent or opaque to the original image as the stamp image.

7. The printing system according to claim 6, wherein in a case where the stamp image read out from the storage unit is a translucent image, the image combining unit combines the stamp image with the original image in overlaying relationship.

8. The printing system according to claim 6, wherein in a case where the stamp image read out from the storage unit is an opaque image, the image combining unit generates a mask image based on the stamp image, combines the mask image with the original image, and combines the stamp image in a region of the mask image on the original image.

9. The printing system according to claim 1, wherein the stamp image is constituted by at least one character or graphic.

10. The printing system according to claim 1, wherein, before a stamp image is transmitted to the image forming apparatus via the network, the computer displays a confirmation message asking whether or not to transmit the stamp image on a display device connected to the computer.

11. A computer configured to be capable of being connected to an image forming apparatus via a network, wherein the computer sets a stamp image and transmits the set stamp image to the image forming apparatus via the network, the image forming apparatus comprising:

a reading device that reads an original image;

a storage unit that stores the stamp image received from the computer;

an image combining unit that reads out at least one stamp image from the storage unit, combines the stamp image with the original image read by the reading device, and forms a composite image; and a printing unit that prints the composite image on recording paper, wherein the image combining unit generates a mask image based on the stamp image, forms a white region in the original image using the generated mask image, and combines the stamp image with the white region thus formed.

12. An image forming apparatus that prints an original image on recording paper, the apparatus comprising:

a reading device that reads an original image;

a storage unit in which a stamp image received from an external apparatus via a network is recorded;

an image combining unit that reads out at least one stamp image from the storage unit, combines the stamp image with the original image read by the reading device, and forms a composite image; and a printing unit that prints the composite image on recording paper, wherein the image combining unit generates a mask image based on the stamp image, forms a white region in the original image using the generated mask image, and combines the stamp image with the white region thus formed.

13. The image forming apparatus according to claim 12, wherein the image combining unit combines at least one stamp image and the original image read by the reading device on a page memory.

14. The image forming apparatus according to claim 12, comprising a display unit that displays display information corresponding to at least one stamp image stored in the storage unit, wherein the storage unit stores a stamp image together with a registration name of the stamp image, the display unit displays the registration name of the stamp image as display information corresponding to the stamp image, and the image combining unit reads out, from the storage unit, at least one stamp image whose registration name is displayed on the display unit, combines the stamp image with the original image read by the reading device, and forms a composite image.

15. The image forming apparatus according to claim 12, comprising a display unit that displays display information corresponding to at least one stamp image stored in the storage unit, wherein the storage unit stores, as the display information corresponding to the stamp image, a registration name of the stamp image, information indicating that the stamp image is an image that is either translucent or opaque to the original image, and a size of recording paper, and the display unit displays a stamp image as a thumbnail, as well as displaying at least one of the registration name of the stamp image, the information indicating that the stamp image is an image that is either translucent or opaque to the original image, and the size of recording paper.

16. The image forming apparatus according to claim 12, comprising:

a display unit that displays display information corresponding to at least one stamp image stored in the storage unit; and a control unit that reads out, from the storage unit, at least one stamp image whose size is the same as a size of recording paper on which the original image read by the reading device is to be recorded and that displays at least one piece of display information corresponding to the read stamp image on the display unit, wherein the image combining unit reads out, from the storage unit, at least one stamp image whose display information is displayed on the display unit, combines the stamp image with the original image read by the reading device, and forms a composite Image.

17. The image forming apparatus according to claim 12, comprising:

a display unit that displays display information corresponding to at least one stamp image stored in the storage unit; and a control unit that selects at least one stamp image whose display information is displayed on the display unit and that prohibits the image combining unit from forming a composite image if a size of the selected stamp image does not match a size of recording paper on which the original image read by the reading device is to be recorded.

18. A printing method for printing a composite image in which a stamp image has been combined with an original image on recording paper using an image forming apparatus in a printing system configured such that a computer and the image forming apparatus can be connected via a network, the method comprising:

a stamp image creating step in which the computer creates a stamp image;

a transmitting step in which the stamp image created in the stamp image creating step is transmitted from the computer to the image forming apparatus via the network;

a recording step in which the image forming apparatus records the stamp image received from the computer in a storage unit included in the image forming apparatus;

a reading step in which the image forming apparatus reads an original image;

a combining step in which the image forming apparatus reads out at least one stamp image from the storage unit, combines the read stamp image with the original image read in the reading step, and forms a composite image; and a printing step in which the image forming apparatus prints the composite image formed in the combining step on recording paper, in the combining step a mask image is generated based on the stamp image, a white region is formed in the original image using the generated mask image, and the stamp image is combined with the white region thus formed.

19. The printing method according to claim 18, comprising:

a displaying step in which the image forming apparatus reads out, from the storage unit, at least one stamp image whose size is the same as a size of recording paper on which the original image read in the reading step is to be recorded and displays at least one piece of display information corresponding to the read stamp image on a display unit included in the image forming apparatus; and a selecting step in which at least one stamp image whose display information is displayed on the display unit is selected, wherein, in the combining step, the image forming apparatus reads out, from the storage unit, one stamp image selected in the selecting step and combines the read stamp image with the original image read in the reading step.

20. The printing method according to claim 18, comprising:

a displaying step in which the image forming apparatus displays display information corresponding to at least one stamp image stored in the storage unit on a display unit;

a selecting step in which one stamp image whose display information is displayed on the display unit is selected; and a prohibiting step in which formation of the composite image is prohibited if a size of the stamp image selected in the selecting step does not match a size of recording paper on which the original image read in the reading step is to be recorded.

\* \* \* \* \*